(12) United States Patent
Li

(10) Patent No.: US 12,127,124 B2
(45) Date of Patent: Oct. 22, 2024

(54) METHOD FOR DYNAMICALLY CHANGING PARAMETER OF WAKE UP SIGNALING, TERMINAL, AND MEDIUM

(71) Applicant: BEIJING XIAOMI MOBILE SOFTWARE CO., LTD., Beijing (CN)

(72) Inventor: Yanhua Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 359 days.

(21) Appl. No.: 17/630,900

(22) PCT Filed: Jul. 31, 2019

(86) PCT No.: PCT/CN2019/098734
§ 371 (c)(1),
(2) Date: Jan. 27, 2022

(87) PCT Pub. No.: WO2021/016958
PCT Pub. Date: Feb. 4, 2021

(65) Prior Publication Data
US 2022/0286965 A1    Sep. 8, 2022

(51) Int. Cl.
*H04W 52/02*    (2009.01)
*H04W 76/20*    (2018.01)
*H04W 80/02*    (2009.01)

(52) U.S. Cl.
CPC ....... *H04W 52/0232* (2013.01); *H04W 76/20* (2018.02); *H04W 80/02* (2013.01)

(58) Field of Classification Search
CPC ..... H04W 52/02; H04W 76/20; H04W 76/11; H04W 76/27; H04W 76/28; H04W 76/14; H04W 72/04; H04W 72/12; H04W 72/23; H04W 68/02; H04W 80/02; H04W 88/02; H04W 88/06; H04W 8/02; H04W 24/08; H04L 5/00; H04L 1/18
USPC ......................................................... 370/318
See application file for complete search history.

(56) References Cited

U.S. PATENT DOCUMENTS

| 8,837,340 | B2 | 9/2014 | Kwon et al. | |
| 10,405,277 | B2* | 9/2019 | Lee ........................ | H04L 5/0098 |
| 10,652,826 | B2* | 5/2020 | Lin ..................... | H04W 52/0235 |
| 11,284,477 | B2* | 3/2022 | Islam ..................... | H04W 76/11 |
| 11,395,228 | B2* | 7/2022 | Thangarasa ........... | H04W 68/02 |
| 11,516,735 | B2* | 11/2022 | Thangarasa ........... | H04W 76/28 |
| 11,564,282 | B2* | 1/2023 | Jiang ................. | H04W 52/0248 |

(Continued)

FOREIGN PATENT DOCUMENTS

| CN | 102577165 A | 7/2012 |
| CN | 109429310 A | 3/2019 |

(Continued)

OTHER PUBLICATIONS

International Search Report of PCT/CN2019/098734 dated Apr. 9, 2020 with English translation, (4p).

(Continued)

*Primary Examiner* — Man U Phan
(74) *Attorney, Agent, or Firm* — Arch & Lake LLP

(57) ABSTRACT

A method for dynamically changing a parameter of a power saving signal is provided. The method is applied to a user equipment in a carrier aggregation and includes: determining a state of a carrier; and changing a pattern parameter of a wake up signaling according to the state of the carrier.

6 Claims, 13 Drawing Sheets

(56) References Cited

U.S. PATENT DOCUMENTS

| | | | |
|---|---|---|---|
| 11,729,717 B2* | 8/2023 | Park | H04W 72/23 |
| | | | 370/311 |
| 11,877,243 B2* | 1/2024 | Lee | H04L 5/0053 |
| 2011/0267955 A1 | 11/2011 | Dalsgaard | |
| 2012/0155355 A1 | 6/2012 | Kwon et al. | |
| 2017/0325168 A1 | 11/2017 | Lee et al. | |
| 2020/0267655 A1* | 8/2020 | Awoniyi-Oteri | |
| | | | H04W 52/0216 |
| 2020/0337110 A1* | 10/2020 | Kim | H04W 76/28 |
| 2020/0404735 A1* | 12/2020 | Nam | H04W 76/28 |
| 2022/0182938 A1* | 6/2022 | Ye | H04W 76/28 |
| 2022/0312324 A1* | 9/2022 | Thangarasa | H04W 68/005 |

FOREIGN PATENT DOCUMENTS

| | | |
|---|---|---|
| CN | 109644459 A | 4/2019 |
| CN | 111937446 A | 11/2020 |

OTHER PUBLICATIONS

First Office Action issued to Chinese Application No. 201980001583.0 dated Oct. 9, 2021 with English translation (14p).

Qualcomm Incorporated, "Fast SCG and SCell Activation", 3GPP TSG-RAN WG1 #97, R1-1907306, Reno, Nevada, May 13-17, 2019, (11p).

LG Electronics, "Numerical Results for UE Power Saving Schemes", 3GPP TSG RAN WG1 #96, R1-1902052, Athens, Greece, Feb. 25, 2019, (9p).

\* cited by examiner

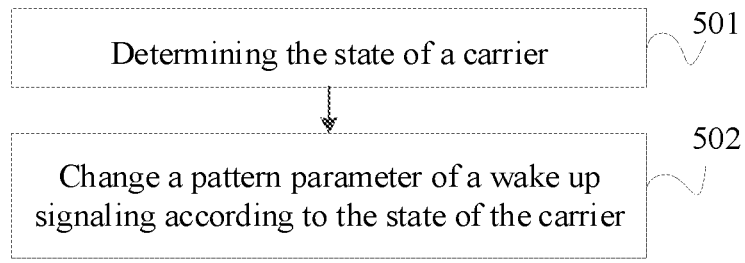
FIG. 5
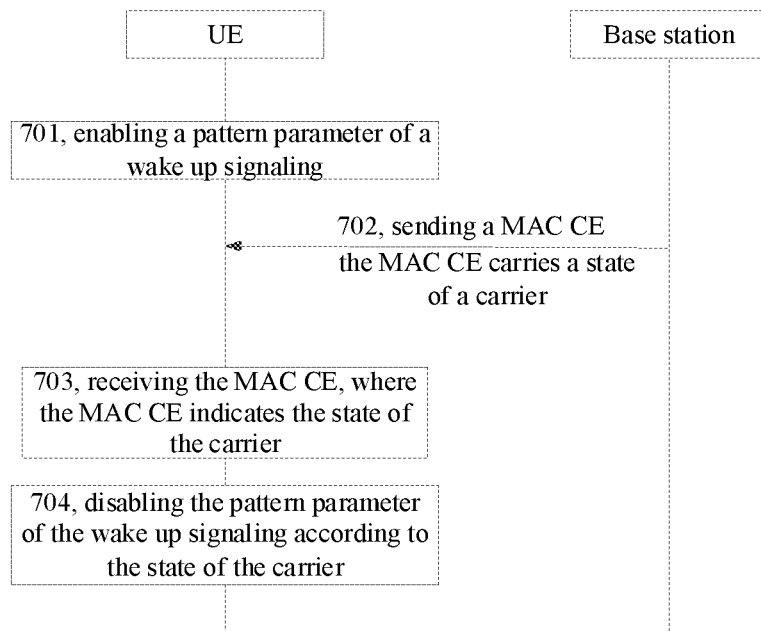
FIG. 6
FIG. 7

METHOD FOR DYNAMICALLY CHANGING PARAMETER OF WAKE UP SIGNALING, TERMINAL, AND MEDIUM

CROSS-REFERENCE TO RELATED APPLICATION

The present application is the U.S. national phase application of International Application No. PCT/CN2019/098734, filed on Jul. 31, 2019, the entire contents of which are hereby incorporated by reference for all purposes.

TECHNICAL FIELD

The present disclosure relates to the field of wireless communication, and in particular to a method, apparatus, terminal and medium for dynamically changing a parameter of a wake up signaling.

BACKGROUND

The Third Generation Partnership Project (3GPP) standard protocol introduces Discontinuous Reception (DRX) as an energy saving strategy. The basic mechanism of DRX is to configure a DRX cycle for the terminal in the Radio Resource Control (RRC) connection state to achieve the purpose of saving power for the terminal. The DRX cycle consists of an activation period and a dormant period.

During the activation period, the terminal monitors and receives the Physical Downlink Control Channel (PDCCH), and during the dormant period, the terminal does not monitor PDCCH to reduce power consumption. Since the terminal is only opportunistically scheduled during the activation period that occurs periodically, there is a situation that data scheduling is not detected by PDCCH detections during most activation periods, which results in waste of detection power. In order to solve this problem, Wake Up Signaling (WUS) is also introduced. When the base station determines that the terminal needs to be scheduled during the activation period, it first sends the wake up signaling to the terminal. If the terminal detects the wake up signaling, the terminal needs to monitor the PDCCH in the next activation period of the DRX cycle. If the terminal does not detect the wake up signaling, the terminal needs to skip the monitoring of the PDCCH in the next activation period of the DRX cycle.

In the carrier aggregation scenario, the secondary component carrier is activated or de-activated according with the need of data transmission, and the data scheduling of the terminal is changing. In terms of how to configure the parameter of the wake up signaling to optimize the monitoring intensity for PDCCH in the carrier aggregation scenario, there is no reasonable solution in related art.

SUMMARY

The present disclosure provides a method, apparatus, terminal and medium for dynamically changing a parameter of a wake up signaling, which may be used to solve the problem of configuring the parameter of the wake up signaling in a carrier aggregation scenario to optimize the monitoring intensity of the PDCCH. The technical solution is as follows.

According to a first aspect of the present disclosure, a method for dynamically changing a parameter of a wake up signaling is provided, which is applied to a user equipment (UE) in a carrier aggregation scenario and includes: determining a state of a carrier; and changing a pattern parameter of a wake up signaling according to the state of the carrier.

According to a second aspect of the present disclosure, a method for dynamically changing a parameter of a wake up signaling is provided, which is applied to a base station in a carrier aggregation scenario and includes: sending a state of a carrier to a UE, where the state of the carrier triggers the UE to change a pattern parameter of a wake up signaling according to the state of the carrier.

According to a third aspect of the present disclosure, a terminal is provided, which includes a processor, a transceiver connected to the processor, and a memory stored executable instructions for the processor. The processor is configured to load and execute the executable instructions to implement the method for dynamically changing a parameter of a wake up signaling as described in the first aspect.

According to a fourth aspect of the present disclosure, an access network device is provided, which includes a processor, a transceiver connected to the processor, and a memory stored executable instructions for the processor. The processor is configured to load and execute the executable instructions to implement the method for dynamically changing a parameter of a wake up signaling as described in the second aspect.

According to a fifth aspect of the present disclosure, a non-transitory computer-readable storage medium is provided, which stores executable instructions that, when being loaded and executed by a processor, cause the processor to implement the method for dynamically changing a parameter of a wake up signaling as described in the first or second aspect.

BRIEF DESCRIPTION OF THE DRAWINGS

In order to clarify the technical solutions in the embodiments of the present disclosure, the description will briefly introduce the accompanying drawings described in the embodiments below. Obviously, the accompanying drawings in the following description only show some of embodiments of the present disclosure, and other accompanying drawings can be obtained based on these drawings without any inventive effort by a person of ordinary skill in the art.

FIG. 5 is a flow chart of a method for dynamically changing a parameter of a wake up signaling provided by an embodiment of the present disclosure.

FIG. 6 is a flow chart of a method for dynamically changing a parameter of a wake up signaling provided by an embodiment of the present disclosure.

FIG. 7 is a flow chart of a method for dynamically changing a parameter of a wake up signaling provided by an embodiment of the present disclosure.

DETAILED DESCRIPTION

In order to make the objectives, technical solutions, and advantages of the present disclosure clearer, the embodiments of the present disclosure will be described in further detail below with reference to the accompanying drawings.

Figure 1:
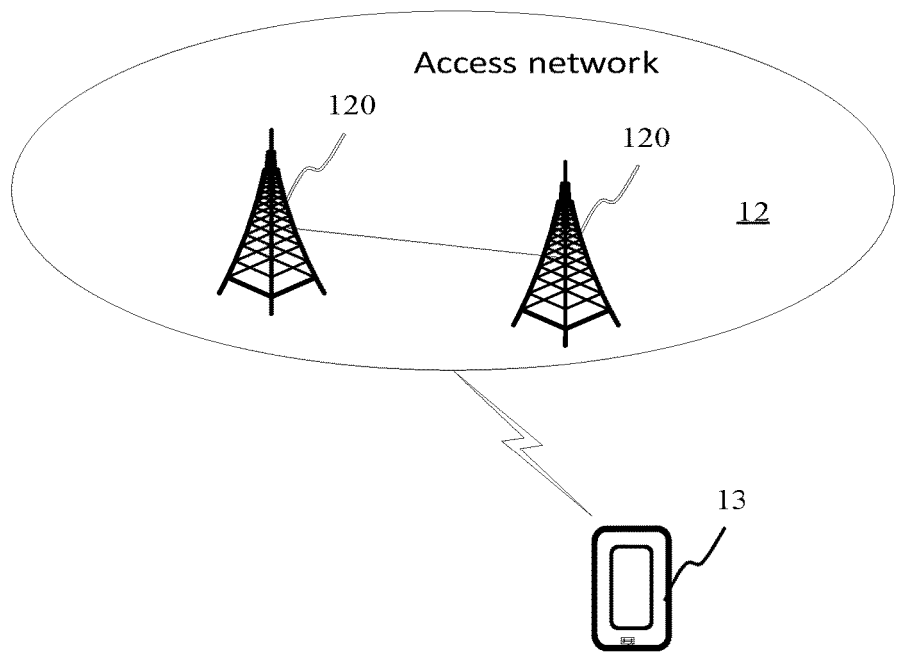
FIG. 1 is a block diagram of a communication system provided by an embodiment of the present disclosure.

FIG. 1 shows a block diagram of a communication system provided by an embodiment of the present disclosure. As shown in FIG. 1, the communication system may include: an access network 12 and a terminal 13.

The access network 12 includes a number of access network devices 120, which communicate with core network devices through some kind of interface technology, e.g., S1 interface in the LTE system, NG interface in the 5G NR system. The access network device 120 may be a base station, and the base station is a device deployed in the access network to provide wireless communication functions for the terminal. The base station may include various forms of macro base station, micro base station, relay station, access point, etc. In systems using different radio interface technologies, the name of device with base station functions may vary, for example, in LTE systems, it is called eNodeB or eNB, while in 5G NR systems, it is called gNodeB or gNB. As communication technology evolves, the name "base station" may change.

The terminal 13 may include various processing devices that have wireless communication functions, such as handheld devices, vehicle-mounted devices, wearable devices, computing devices or other processing devices connected to a wireless modem, as well as various forms of user equipment, Mobile Stations (MSs), etc. The access network device 120 and the terminal 13 communicate with each other through a certain air interface technology, such as a Uu interface.

Several technical terms involved in embodiments of this application are briefly described below.

Discontinuous Reception (DRX): DRX allows the terminal to periodically go to sleep at certain times and not monitor the PDCCH scheduling information (or called PDCCH subframe). When the terminal needs to monitor the PDCCH scheduling information, it will wake up from the dormant period, so that the terminal can achieve the purpose of power saving.

Figure 2:
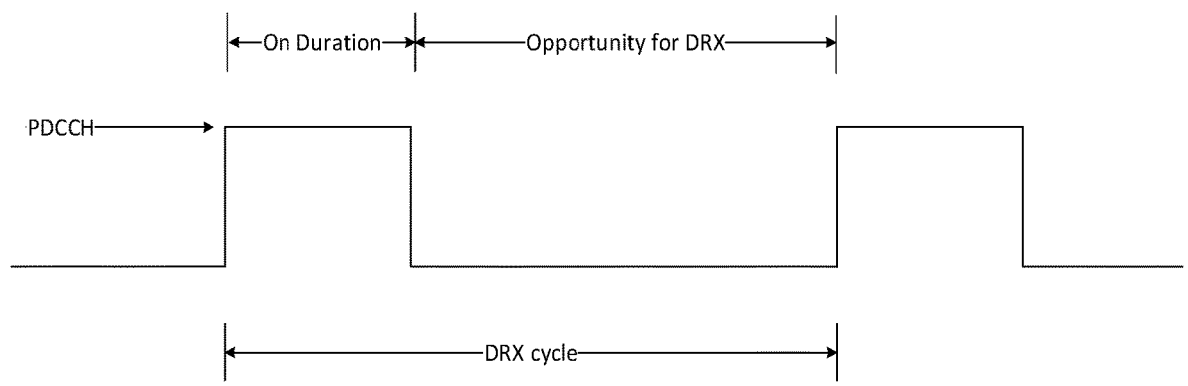
FIG. 2 is a schematic diagram of a DRX mechanism provided by an embodiment of the present disclosure.

The basic mechanism of DRX is to configure a DRX cycle for a terminal in the RRC_CONNECTED state. DRX cycle consists of an activation period (usually called "On Duration") and a dormant period (usually called "Opportunity for DRX"). During the "On Duration", the terminal monitors and receives PDCCH scheduling information, and during the "Opportunity for DRX", the terminal does not receive data from the downlink channel to save power. As can be seen from FIG. 2, in the time domain, time is divided into successive DRX cycles. When the terminal receives a scheduling message during the "On Duration", the terminal will start a DRX-Inactivity Timer and monitor the PDCCH scheduling information in every subframe during the "On Duration". If the DRX-Inactivity Timer has not expired yet, the terminal still needs to continue to monitor the PDCCH subframe in the downlink until the DRX Inactivity Timer expires even if the originally configured time for "On Duration" is over.

A DRX cycle is equal to the sum of the wake-up time and the sleep time of the terminal. The wake-up time is the duration of the active state in one DRX cycle, and the sleep time is the duration of the dormant period in one DRX cycle.

Wake up signaling: In 5G and LTE evolution projects, DRX enhancement mechanism is being discussed. For example, although the network is configured with DRX mechanism for the terminal, the terminal is only be scheduled opportunistically in the periodic "On Duration", and even in the case of low service load, the terminal will only be scheduled in a few DRX cycles, and for paging messages with the DRX mechanism, the terminal receives the paging messages even less. Therefore, after the terminal is configured with the DRX mechanism, there are still PDCCH detections that do not detect data scheduling on most "On Durations". If the terminal detects PDCCH blindly when there is no data scheduling, the power of detection is wasted, and thus, the current DRX mechanism needs to be further optimized.

In this regard, one solution is that if the base station determines that the terminal needs to be scheduled during an "On Duration" of a DRX cycle, it sends a wake up signaling to the terminal, which wakes up the terminal and makes the terminal perform PDCCH detection during the "On Duration" of the DRX cycle. If the base station determines that the terminal does not need to be scheduled during the "On Duration" of the DRX cycle, it can instruct the terminal not to perform PDCCH detection during the "On Duration" of the DRX cycle.

In addition, it has been found that the wake up signaling may not only wake up the terminal to detect the PDCCH, but also indicate the target BandWidth Part (BWP) used when the terminal wakes up, the configuration of the used PDCCH search space, and other information. In the embodiments of this application, the functions of the wake up signaling may include all or some of the above functions, or may include functions not shown in the above functions, without limitation.

Figure 3:
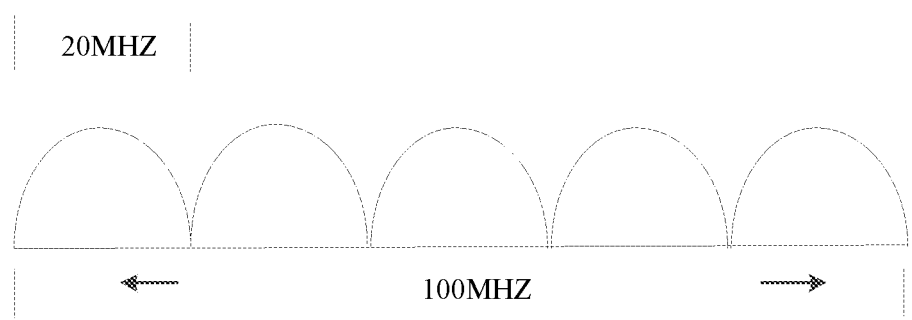
FIG. 3 is a schematic diagram of carrier aggregation provided by an embodiment of the present disclosure.

Carrier aggregation: Carrier aggregation (CA) is an aggregation of two or more Component Carriers (CCs) to support a larger transmission bandwidth. As shown in FIG. 3, the CA technology can aggregate 2 to 5 carriers together to achieve a maximum transmission bandwidth of 100 MHz, effectively improving the uplink and downlink transmission rates.

A Primary Cell (PCell) is a cell to which the terminal performs initial connection establishment, or a cell where RRC connection reestablishment is performed, or a primary cell designated during a cell handover process. The PCell is responsible for RRC communication with the terminal. The CC corresponding to the PCell is called a Primary Component Carrier (PCC).

A Secondary Cell (SCell) is added during RRC reconfiguration to provide additional radio resources, and there is no RRC communication between the SCell and the terminal. The CC corresponding to the SCell is called a Secondary Component Carrier (SCC).

There is only one PCC at the same time, and there may be more than one SCC, such as three SCCs. The network may set the temporarily unused SCC(s) to the inactive state as needed to reduce the power consumption of the terminal, and may also quickly activate the SCC(s) to meet the transmission needs. The PCC of the terminal cannot be deactivated. The terminal can only perform data transmission on the active carrier(s), and only limited measurements are supported on the deactivated carrier(s).

It should be understood that when the SCC is activated, it is often the moment when a large amount of data is transmitted. At this time, it is necessary to make the monitoring of the PDCCH more intensive to increase the data transmission rate.

With reference to FIGS. 4A-4E, the configuration of the wake up signaling in front of the DRX cycle includes the following four situations.

Figure 4A:
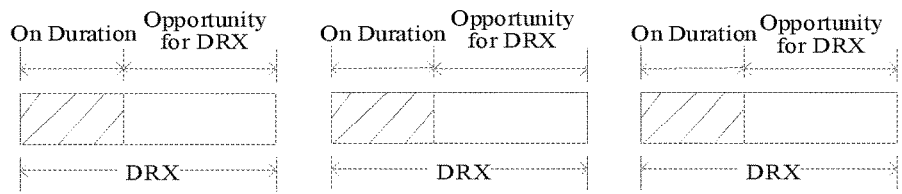
FIG. 4A is a schematic diagram of a pattern parameter of a wake up signaling provided by an embodiment of the present disclosure.

As shown in FIG. 4A, the wake up signaling is disabled and no wake up signaling is configured in front of each DRX cycle. The terminal monitors the PDCCH during each "On Duration" of the DRX cycle.

Figure 4B:
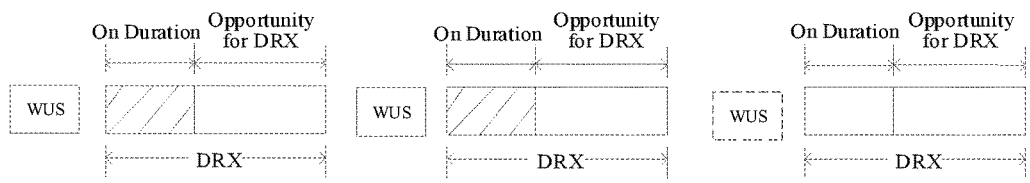
FIG. 4B is a schematic diagram of a pattern parameter of a wake up signaling provided by an embodiment of the present disclosure.

As shown in FIG. 4B, one wake up signaling is configured in front of each DRX cycle, and the mapping relationship between the wake up signaling and the DRX cycle is 1:1. When the terminal detects a wake up signaling, it monitors the PDCCH during the "On Duration" of the first one DRX cycle after the wake up signaling, and when the wake up signaling is not detected by the terminal, the terminal skips the monitoring of the PDCCH in the "On Duration" of the first DRX cycle after the wake up signaling.

Figure 4C:
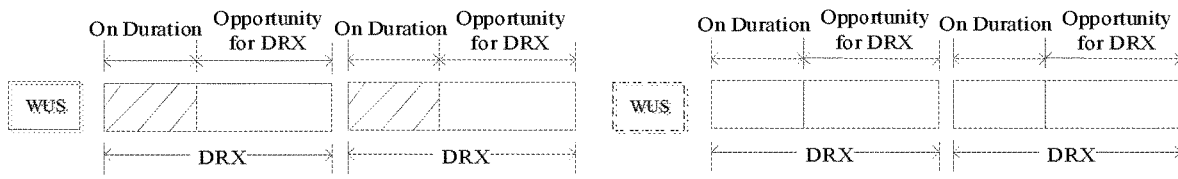
FIG. 4C is a schematic diagram of a pattern parameter of a wake up signaling provided by an embodiment of the present disclosure.

As shown in FIG. 4C, one wake up signaling is configured in front of every successive N DRX cycles, N is an integer greater than 1, and the mapping relationship between the wake up signaling and the DRX cycle is 1:N. When the terminal detects a wake up signaling, it monitors the PDCCH during the "On Durations" of the first N DRX cycles after the wake up signaling, and when the wake up signaling is not detected by the terminal, the terminal skips the monitoring of the PDCCH in the "On Durations" of the first N DRX cycles after the detection location. In FIG. 4C, the value of N is 2.

Figure 4D:
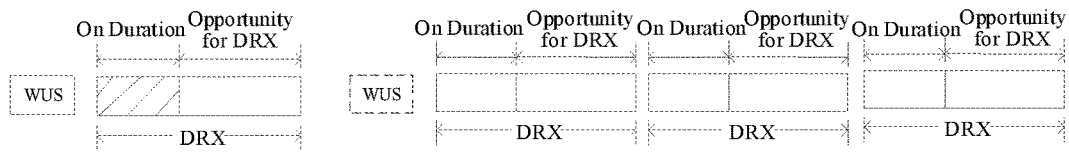
FIG. 4D is a schematic diagram of a pattern parameter of a wake up signaling provided by an embodiment of the present disclosure.
Figure 4E:
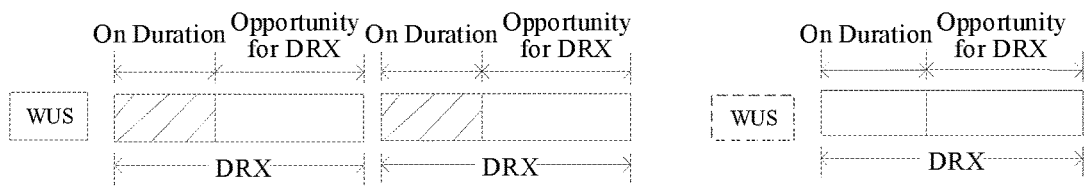
FIG. 4E is a schematic diagram of a pattern parameter of a wake up signaling provided by an embodiment of the present disclosure.

As shown in FIGS. 4D and 4E, when the terminal detects a wake up signaling, it monitors and receives the PDCCH during the "On Durations" of the first N1 DRX cycles after the wake up signaling, i.e., the mapping relationship between the wake up signaling and DRX cycle is 1:N1 when the wake up signaling is detected, and when the wake up signaling is not detected by the terminal, it skips the monitoring of the PDCCH in the "On Durations" of the first N DRX cycles after the wake up signaling, i.e., the mapping relationship between the wake up signaling and DRX cycle is 1:N2 when the wake up signaling is not detected. Here, N1 and N2 are integers, and the values of N1 and N2 are not equal. In FIG. 4D, the value of N1 is 1, and the value of N2 is 3. In FIG. 4E, the value of N1 is 2, and the value of N2 is 1.

FIG. 5 shows a flow chart of a method for dynamically changing a parameter of a wake up signaling provided by an embodiment of the present disclosure, which is applied to a UE in a carrier aggregation scenario. The method includes the following steps.

At Step 501, a state of a carrier is determined.

UE is a device that supports a wake up signaling.

The state of the carrier includes an activated state and an inactive state.

In an example, if the UE is configured with one PCC and at least one SCC, the PCC is always in an active state, and the UE may active or de-active the configured SCC(s) via MAC CE.

For the SCC in the inactive state, the UE does not monitor the PDCCH channel of the SCC, and does not perform data transmission on the uplink shared channel of the SCC.

At step 502, a pattern parameter of a wake up signaling is changed according to the state of the carrier.

The monitoring intensity for the PDCCH is determined according to the number of DRX cycles to which the wake up signaling is mapped.

When enabling the pattern parameter, N1 represents the number of DRX cycles mapped to a wake up signaling when the wake up signaling is monitored, and the monitoring intensity is proportional to the value of N1. The larger the value of N1 is, the higher the monitoring intensity is; and the smaller the value of N1 is, the lower the monitoring intensity is.

When enabling the pattern parameter, N2 represents the number of DRX cycles mapped to a wake up signaling when no wake up signaling is monitored, and the monitoring intensity is inversely proportional to the value of N2. The larger the value of N2 is, the lower the monitoring intensity is; and the smaller the value of N2 is, the higher the monitoring intensity is.

Increasing the monitoring intensity for PDCCH includes at least one of the following conditions: disabling the pattern parameter of the wake up signaling, increasing the value of N1, decreasing the value of N2, or, increasing the value of N1 and decreasing the value of N2.

Decreasing the monitoring intensity for PDCCH includes at least one of the following conditions: enabling the pattern parameter of the wake up signaling, decreasing the value of N1, increasing the value of N2, or, decreasing the value of N1 and increasing the value of N2.

Changing the pattern parameter of the wake up signaling includes at least one of the following situations.

1. Change from the disabled pattern parameter of the wake up signaling to the enabled pattern parameter of the wake up signaling.

For example, the pattern parameter as shown in FIG. 4A is changed to the pattern parameter as shown in FIG. 4B; or the pattern parameter as shown in FIG. 4A is changed to the pattern parameter as shown in FIG. 4C; or the pattern parameter as shown in FIG. 4A is changed to the pattern parameter as shown in FIG. 4D.

2. Change from the enabled pattern parameter of the wake up signaling to the disabled pattern parameter of the wake up signaling.

For example, the pattern parameter as shown in FIG. 4B is changed to the pattern parameter as shown in FIG. 4A; or the pattern parameter as shown in FIG. 4C is changed to the pattern parameter as shown in FIG. 4A; or the pattern parameter as shown in FIG. 4D is changed to the pattern parameter as shown in FIG. 4A.

3. Change from the first pattern parameter of the wake up signaling to the second pattern parameter of the wake up signaling.

For example, the pattern parameter as shown in FIG. 4D is changed to the pattern parameter as shown in FIG. 4B. When a wake up signaling is detected, as shown in FIGS. 4B and 4D, both monitoring is performed for PDCCH during the first one DRX cycle after the wake up signaling. When the wake up signaling is not detected, as shown in FIG. 4D, the terminal skips monitoring the PDCCH in the next 3 DRX cycles, while as shown in FIG. 4B, the terminal skips monitoring the PDCCH in the next one DRX cycle. Thus, the monitoring intensity becomes higher.

4. Change from the second pattern parameter of the wake up signaling to the first pattern parameter of the wake up signaling.

For example, the pattern parameter as shown in FIG. 4B is changed to the pattern parameter as shown in FIG. 4D. When a wake up signaling is detected, as shown in FIGS. 4B and 4D, both monitoring is performed for PDCCH during the first one DRX cycle after the wake up signaling. When the wake up signaling is not detected, as shown in FIG. 4B, the terminal skips monitoring the PDCCH in the next one DRX cycle, while as shown in FIG. 4D, the terminal skips monitoring the PDCCH in the next 3 DRX cycles. Thus, the monitoring intensity becomes lower.

In the embodiment with reference to FIG. 5, when the first SCC is in the activated state, the activation of the first SCC triggers the UE to disable the pattern parameter of the wake up signaling, or triggers the UE to change the first pattern parameter of the wake up signaling to the second pattern parameter.

When at least T1 SCCs are in the activated state, the activation of the at least T1 SCCs triggers the UE to disable the pattern parameter of the wake up signaling, or triggers the UE to change the first pattern parameter of the wake up signaling to the second pattern parameter. T1 is an integer greater than 1.

When each SCC is in the inactive state, the inactive state(s) of all SCC(s) triggers/trigger the UE to enable the pattern parameter of the wake up signaling, or triggers/trigger the UE to change the second pattern parameter of the wake up signaling to the first pattern parameter.

When at least T2 SCCs are in an inactive state, the inactive states of the at least T2 SCCs trigger the UE to enable the pattern parameter of the wake up signaling, or trigger the UE to change the second pattern parameter of the wake up signaling to the first pattern parameter. T2 is an integer greater than 1.

In summary, in the method provided in this embodiment, in the scenario of carrier aggregation, the UE adjusts the monitoring intensity for the PDCCH by dynamically changing the parameter of the wake up signaling according to the state of the carrier, which saves the power used by the UE for monitoring.

FIG. 6 shows a flow chart of a method for dynamically changing a parameter of a wake up signaling provided by an embodiment of the present disclosure, which is applied to a base station in a carrier aggregation scenario. The method includes following steps.

At step 601, a state of a carrier is sent to a UE, where the state of the carrier triggers the UE to change a pattern parameter of a wake up signaling according to the state of the carrier.

In an example, sending the state of the carrier includes: sending a MAC CE, where the MAC CE carries the state of the carrier.

The state of the carrier includes an activated state and an inactive state. In a multi-carrier system, when the UE works on multiple carriers at the same time, it needs to monitor the scheduling signaling on the multiple carriers at the same time, and feed back downlink channel quality information on the multiple carriers at the same time, which greatly increases the energy consumption of the UE. Therefore, by introducing the carrier activation/deactivation mechanism in the base station, the transmission bandwidth can be quickly changed, adapting to service requirements and reducing the power consumption of the terminal.

In an optional example, the MAC CE carries an indication indicating the UE to change the pattern parameter of the wake up signaling.

In an example, the state of the carrier includes: a first SCC being in an activated state. The activation of first SCC triggers the UE to disable the pattern parameter of the wake up signaling, or triggers the UE to change a first pattern parameter of the wake up signaling to a second pattern parameter.

In an example, the state of the carrier include: at least T1 SCCs being in an activated state. The activation of the at least T1 SCCs triggers the UE to disable the pattern parameter of the wake up signaling, or triggers the UE to change a first pattern parameter of the wake up signaling to a second pattern parameter.

Here, T1 is an integer greater than 1. A monitoring intensity for PDCCH corresponding to the first pattern parameter is less than a monitoring intensity for PDCCH corresponding to the second pattern parameter, and the monitoring intensity for PDCCH is determined according to the number of DRX cycles mapped by the wake up signaling.

In an optional example, the base station may send the first RRC message or the first system message to the UE in advance. The first RRC message or the first system message carries the value of T1. After that, the base station sends the MAC CE to the UE to indicate the state of the carrier.

The first RRC message or the first system message refers to an RRC message or a system message notifying the UE that the monitoring intensity for PDCCH will increase.

In an example, the state of the carrier include: each SCC being in an inactive state. The inactive state(s) of all SCC(s) triggers/trigger the UE to enable the pattern parameter of the wake up signaling, or triggers/trigger the UE to change a second pattern parameter of the wake up signaling to a first pattern parameter.

In an example, the states of the carriers include: at least T2 SCCs being in the inactive state. The inactive states of at least T2 secondary carriers trigger the UE to enable the pattern parameter of the wake up signaling, or trigger the UE to change a second pattern parameter of the wake up signaling to a first pattern parameter.

Here, T2 is an integer greater than 1. A monitoring intensity for PDCCH corresponding to the first pattern parameter is less than a monitoring intensity for PDCCH corresponding to the second pattern parameter, and the monitoring intensity for PDCCH is determined according to the number of DRX cycles mapped by the wake up signaling.

In an optional example, the base station may send the second RRC message or the second system message to the UE in advance. The second RRC message or the second system message carries the value of T2. After that, the base station sends the MAC CE to the UE to indicate the state of the carrier.

The second RRC message or the second system message refers to an RRC message or a system message notifying the UE that the monitoring intensity for PDCCH will decrease.

In summary, in the method provided in this embodiment, in the scenario of carrier aggregation, the base station notifies the UE to change the parameter of the wake up signaling by sending the state of the carrier, so that the monitoring intensity for the PDCCH is adjusted by the UE, saving the power used by the UE for monitoring.

With reference to FIG. 7, FIG. 7 shows a flow chart of a method for dynamically changing a parameter of a wake up signaling provided by an embodiment of the present disclosure, which is applied in a carrier aggregation scenario. The change of the pattern parameter of the wake up signaling shown in FIG. 7 is that the enabled pattern parameter of the wake up signaling is changed to the disabled pattern parameter of the wake up signaling. The method includes the following steps.

At step 701, UE enables a pattern parameter of a wake up signaling.

As shown in FIGS. 4B-4D, when the pattern parameter of the wake up signaling is enabled, the wake up signaling can wake up the UE to monitor PDCCH during the "On Duration" of the DRX cycle.

At step 702, the base station sends a MAC CE to the UE, and the MAC CE carries a state of a carrier.

In an optional example, the MAC CE further carries a first indication, and the first indication indicates the UE to change the pattern parameter of the wake up signaling.

For example, the first indication may be carried in a reserved bit R of the MAC CE. When the first SCC is in an activated state, R in the MAC CE is set to 1, and the first indication indicates to change from the enabled pattern parameter of the wake up signaling to the disabled pattern parameter of the wake up signaling.

Figure 8:
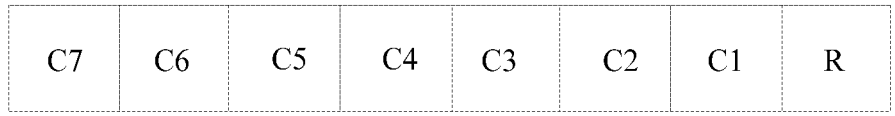
FIG. 8 is a format diagram of a carrier MAC CE provided by an embodiment of the present disclosure.

With reference to FIG. 8, FIG. 8 shows a format diagram of a carrier MAC CE provided by an embodiment of the present disclosure. The carrier MAC CE, as shown, is included in the sub-header of the MAC PDU, which is fixed to a length of one byte and includes a 7-bit "C" field and a 1-bit "R" field.

The "C" field indicates whether the corresponding SCC is activated. When the "Ci" bit is set to 1, the SCC identified as i is activated (i.e., i is an integer from 1 to 7). When the "Ci" bit is set to 0, the SCC identified as i is deactivated.

PCC is always in an activated state. If the terminal is configured with at least one SCC, the network can activate and deactivate the configured SCC(s) via the MAC CE. For a deactivated SCC, the UE does not monitor its PDCCH channel and does not perform data transmission on the uplink shared channel of the carrier. For each SCC, the UE maintains a SCell Deactivation Timer, and the network informs the UE of the initial value of the timer via RRC message.

If the UE receives a MAC CE to activate one SCC, UE may activate the SCC corresponding to the MAC CE and start the timer. If the UE receives a MAC CE to deactivate one SCC or the timer corresponding to the SCC expires, UE may deactivate the SCC, stops the timer, and clears the relevant Hybrid Automatic Repeat Request (HARD) cache.

The "R" field is a reserved bit.

At step 703, the UE receives the MAC CE, and the MAC CE indicates the state of the carrier.

For example, the UE confirms the state(s) of all configured SCC(s), in response to the first SCC being in the inactive state, the UE does not change the pattern parameter of the wake up signaling, and in response to the first SCC being in the activated state, the UE changes the pattern parameter of the wake up signaling.

At step 704, the UE disables the pattern parameter of the wake up signaling according to the state of the carrier.

For example, when the first SCC is in the active state, the UE disables the pattern parameter of the wake up signaling. As shown in FIG. 4A, when the pattern parameter of the wake up signaling is disabled, the UE will monitor the PDCCH in each "On Duration" of the DRX cycles.

In summary, in the method provided in this embodiment, after the pattern parameter of the wake up signaling is enabled, the UE disables the pattern parameter of the wake up signaling according to the activation of the first SCC, so that the monitoring intensity of the UE for the PDCCH is adjusted, which saves the power used by the UE for monitoring.

Figure 9:
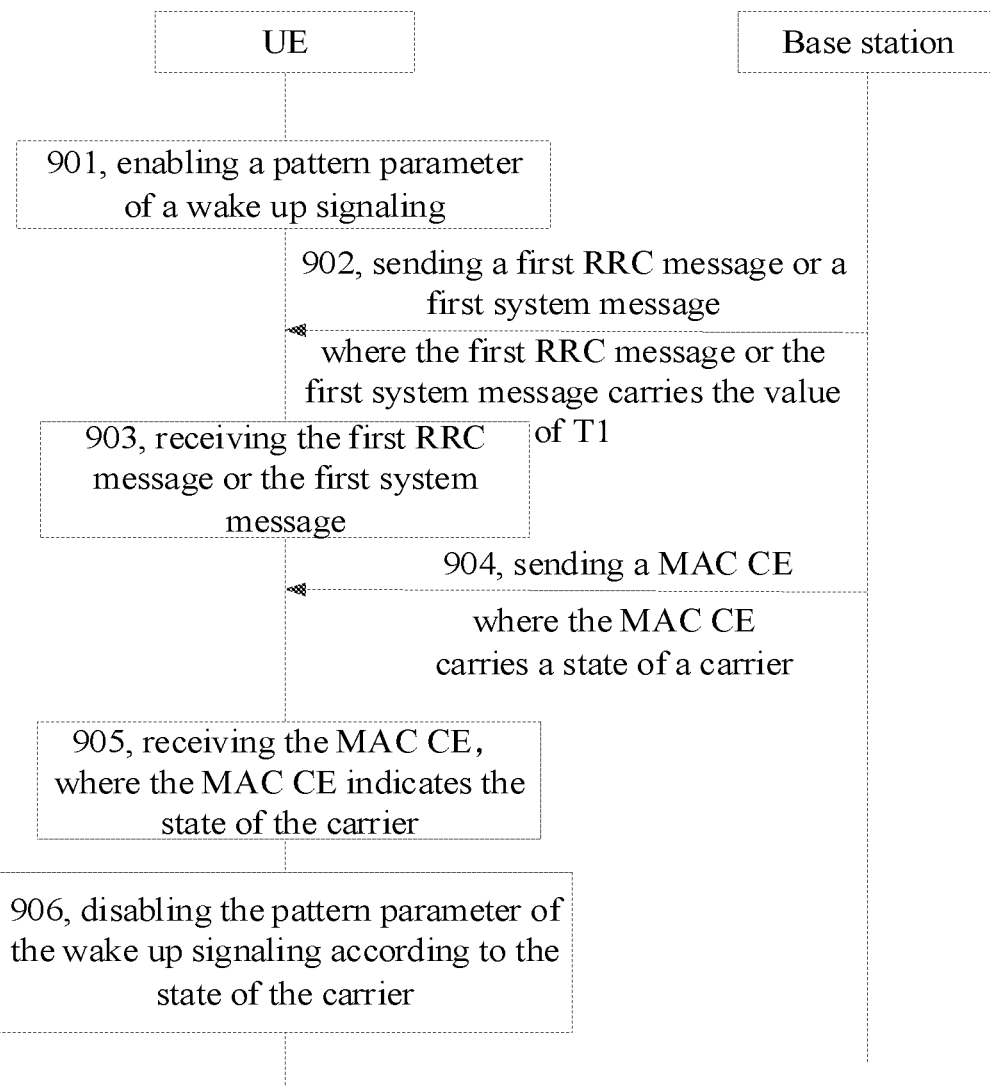
FIG. 9 is a flow chart of a method for dynamically changing a parameter of a wake up signaling provided by an embodiment of the present disclosure.

With reference to FIG. 9, FIG. 9 shows a flow chart of a method for dynamically changing a parameter of a wake up signaling provided by an embodiment of the present disclosure, which is applied in a carrier aggregation scenario. The change of the pattern parameter of the wake up signaling shown in FIG. 9 is that the enabled pattern parameter of the wake up signaling is changed to the disabled pattern parameter of the wake up signaling. The method includes the following steps.

At step 901, a pattern parameter of a wake up signaling is enabled.

As shown in FIG. 4B, 4C, or 4D, when the pattern parameter of the wake up signaling is enabled, the wake up signaling can wake up the UE to monitor PDCCH during the "On Duration" of the DRX cycle.

At step 902, the base station sends a first RRC message or a first system message to the UE. The first RRC message or the first system message carries the value of T1.

Here, T1 is an integer greater than 1. The first RRC message or the first system message refers to an RRC message or a system message notifying the UE that the monitoring intensity for PDCCH will increase.

At step 903, the UE receives the first RRC message or the first system message.

At step 904, the base station sends a MAC CE to the UE, and the MAC CE carries a state of a carrier.

In an optional example, the MAC CE further carries a first indication, and the first indication indicates the UE to change the pattern parameter of the wake up signaling.

For example, the first indication may be carried in a reserved bit R of the MAC CE. When there are T1 SCCs in an activated state, R in the MAC CE is set to 1, and the first indication indicates to change from enabled pattern parameter of the wake up signaling to the disabled pattern parameter of the wake up signaling.

At step 905, the UE receives the MAC CE, and the MAC CE indicates the state of the carrier.

For example, the UE confirms the states of all configured SCCs, in response to less than T1 SCCs being in the activated state, the UE does not change the pattern parameter of the wake up signaling, and in response to T1 SCCs being in the activated state, the UE changes the pattern parameter of the wake up signaling.

At step 906, the UE disables the pattern parameter of the wake up signaling according to the state of the carrier.

When there are T1 SCCs in the activated state, the UE disables the pattern parameter of the wake up signaling. As shown in FIG. 4A, when the pattern parameter of the wake up signaling is disabled, the UE will monitor the PDCCH in each "On Duration" of the DRX cycle.

In summary, in the method provided in this embodiment, after the pattern parameter of the wake up signaling is enabled, the UE disables the pattern parameter of the wake up signaling according to the existing T1 SCCs that are in the activated state, so that the monitoring intensity of the UE for the PDCCH is adjusted, which saves the power used by the UE for monitoring.

Figure 10:
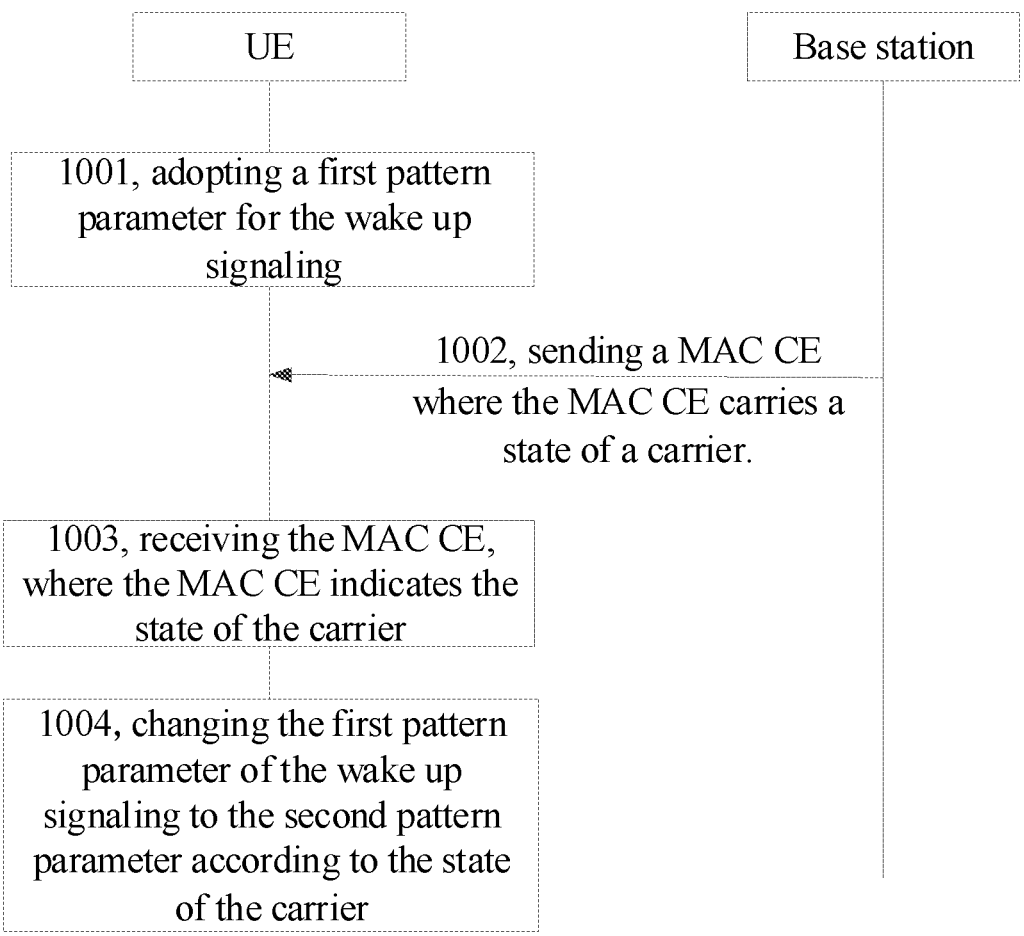
FIG. 10 is a flow chart of a method for dynamically changing a parameter of a wake up signaling provided by an embodiment of the present disclosure.

With reference to FIG. 10, FIG. 10 shows a flow chart of a method for dynamically changing a parameter of a wake up signaling provided by an embodiment of the present disclosure, which is applied in a carrier aggregation scenario. The change of the pattern parameter of the wake up signaling shown in FIG. 10 is that the first pattern parameter of the wake up signaling is changed to the second pattern parameter. The method includes the following steps.

At step 1001, a first pattern parameter is adopted for the wake up signaling.

At step 1002, the base station sends a MAC CE to the UE, and the MAC CE carries a state of a carrier.

In an optional example, the MAC CE further carries a second indication, and the second indication indicates the UE to change the pattern parameter of the wake up signaling.

For example, the second indication may be carried in a reserved bit R of the MAC CE. When the first SCC is in an activated state, R in the MAC CE is set to 1, and the second indication indicates to change from the first pattern parameter of the wake up signaling to the second pattern parameter.

At step 1003, the UE receives the MAC CE, and the MAC CE indicates the state of the carrier.

For example, the UE confirms the state(s) of all configured SCC(s), in response to the first SCC being in the inactive state, the UE does not change the pattern parameter of the wake up signaling, and in response to the first SCC being in the activated state, the UE changes the pattern parameter of the wake up signaling.

At step 1004, the UE changes the first pattern parameter of the wake up signaling to the second pattern parameter according to the state of the carrier.

A monitoring intensity for PDCCH corresponding to the first pattern parameter is less than a monitoring intensity for PDCCH corresponding to the second pattern parameter, and the monitoring intensity for PDCCH is determined according to a quantity of DRX cycles mapped by the wake up signaling.

For example, the first pattern parameter may be as shown in one of FIGS. 4B-4D, and the second pattern parameter may be shown as the other of FIGS. 4B-4D.

For example, the first pattern parameter of the wake up signaling is shown in FIG. 4D. When the terminal detects a wake up signaling, the terminal monitors and receives the PDCCH during the "On Duration" of the first one DRX cycle after the wake up signaling, i.e., the mapping relationship between the wake up signaling and DRX cycle is 1:1 when the wake up signaling is detected. When the wake up signaling is not detected by the terminal, the monitoring for the PDCCH is skipped for the "On Durations" of the first 3 DRX cycles after the wake up signaling, i.e., the mapping relationship between the wake up signaling and the DRX cycle is 1:3 when the wake up signaling is not detected. The second pattern parameter of the wake up signaling is shown in FIG. 4B, and the mapping relationship between the wake up signaling and the DRX cycle is 1:1. When the terminal detects a wake up signaling, the terminal monitors the PDCCH in the "On Duration" of the first one DRX cycle after the wake up signaling. When the wake up signaling is not detected by the terminal, the monitoring for the PDCCH is skipped for the "On Duration" of the first one DRX cycle after the wake up signaling.

When the first SCC is in the activated state, the first pattern parameter of the wake up signaling is changed to the second pattern parameter, and the monitoring intensity for the PDCCH by the UE becomes more intensive.

For another example, the first pattern parameter of the wake up signaling is shown in FIG. 4C, i.e., the mapping relationship between the wake up signaling and the DRX cycle is 1:2. When the terminal detects a wake up signaling, the terminal monitors the PDCCH during the "On Durations" of the first two DRX cycles after the wake up signaling. When the wake up signaling is not detected by the terminal, the monitoring for the PDCCH is skipped for the "On Durations" of the first two DRX cycles after the wake up signaling. The second pattern parameter of the wake up signaling is shown in FIG. 4E, when the terminal detects a wake up signaling, the terminal monitors and receives the PDCCH during the "On Durations" of the first 2 DRX cycles after the wake up signaling, i.e., the mapping relationship between the wake up signaling and the DRX cycle is 1:2 when the wake up signaling is detected. When the wake up signaling is not detected by the terminal, the monitoring for the PDCCH is skipped for the "On Duration" of the first one DRX cycle after the wake up signaling, i.e., the mapping relationship between the wake up signaling and the DRX cycle is 1:1 when the wake up signaling is not detected.

When the first SCC is in the activated state, the first pattern parameter of the wake up signaling is changed to the second pattern parameter, and the monitoring intensity of the PDCCH by the UE becomes more intensive.

In summary, in the method provided in this embodiment, after the first pattern parameter is adopted for the wake up signaling, the UE changes the first pattern parameter of the wake up signaling to the second pattern parameter according to the activation of the first SCC, so that the monitoring intensity of the UE for the PDCCH is adjusted, which saves the power used by the UE for monitoring.

Figure 11:
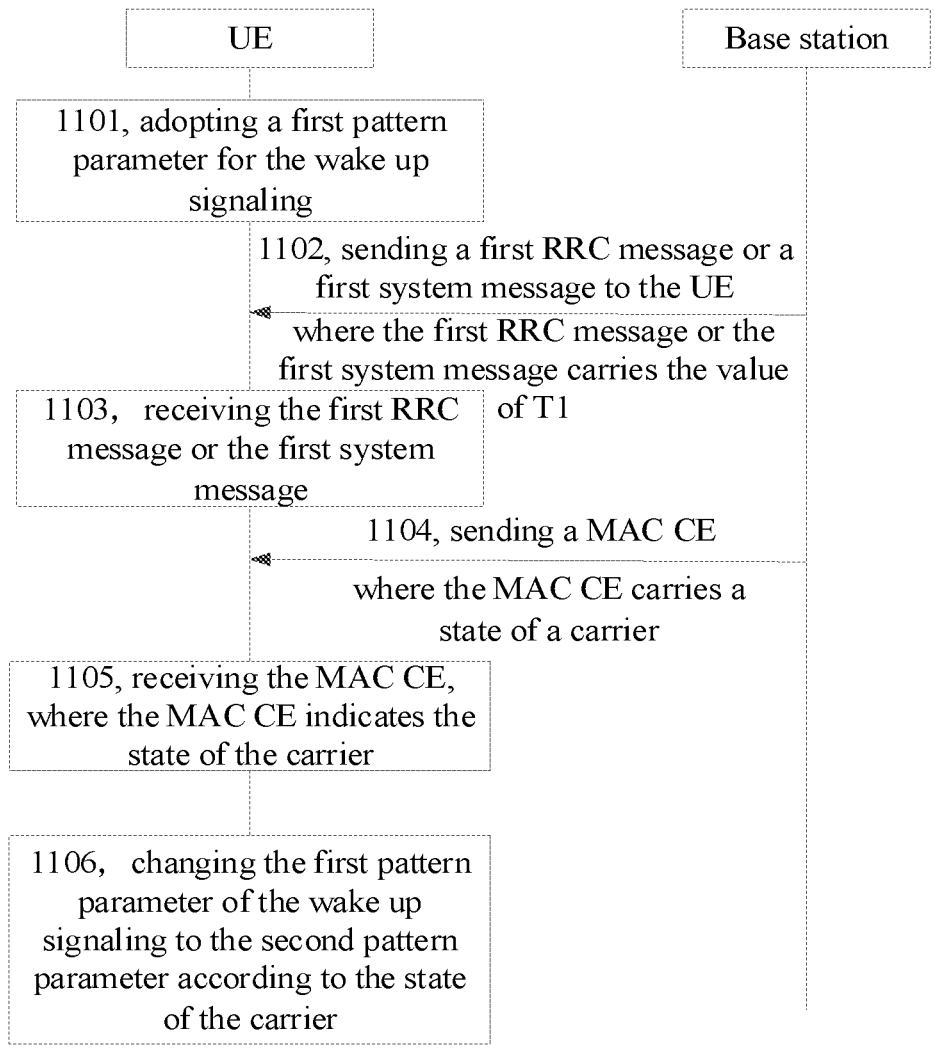
FIG. 11 is a flow chart of a method for dynamically changing a parameter of a wake up signaling provided by an embodiment of the present disclosure.

With reference to FIG. 11, FIG. 11 shows a flow chart of a method for dynamically changing a parameter of a wake up signaling provided by an embodiment of the present disclosure, which is applied in a carrier aggregation scenario. The change of the pattern parameter of the wake up signaling shown in FIG. 11 is that the first pattern parameter of the wake up signaling is changed to the second pattern parameter. The method includes the following steps.

At step 1101, a first pattern parameter is adopted for the wake up signaling.

At step 1102, the base station sends a first RRC message or a first system message to the UE. The first RRC message or the first system message carries the value of T1.

Here, T1 is an integer greater than 1. The first RRC message or the first system message refers to an RRC message or a system message notifying the UE that the monitoring intensity for PDCCH will increase.

At step 1103, the UE receives the first RRC message or the first system message.

At step 1104, the base station sends a MAC CE to the UE, and the MAC CE carries a state of a carrier.

In an optional example, the MAC CE further carries a second indication, and the second indication indicates the UE to change the pattern parameter of the wake up signaling.

For example, the second indication may be carried in a reserved bit R of the MAC CE. When there are T1 SCCs in an activated state, R in the MAC CE is set to 1, and the second indication indicates to change from the first pattern parameter of the wake up signaling to the second pattern parameter.

At step 1105, the UE receives the MAC CE, and the MAC CE indicates the state of the carrier.

For example, the UE confirms the states of all configured SCCs, in response to less than T1 SCCs being in the activated state, the UE does not change the pattern parameter of the wake up signaling, and in response to T1 SCCs being in the activated state, the UE changes the pattern parameter of the wake up signaling.

At step 1106, the UE changes the first pattern parameter of the wake up signaling to the second pattern parameter according to the state of the carrier.

A monitoring intensity for PDCCH corresponding to the first pattern parameter is less than a monitoring intensity for PDCCH corresponding to the second pattern parameter, and the monitoring intensity for PDCCH is determined according to a quantity of DRX cycles mapped by the wake up signaling.

For example, the first pattern parameter may be as shown in one of FIGS. 4B-4D, and the second pattern parameter may be shown as the other of in FIGS. 4B-4D.

For example, the first pattern parameter of the wake up signaling is shown in FIG. 4D. When the terminal detects a wake up signaling, the terminal monitors and receives the PDCCH during the "On Duration" of the first one DRX cycle after the wake up signaling, i.e., the mapping relationship between the wake up signaling and DRX cycle is 1:1 when the wake up signaling is detected. When the wake up signaling is not detected by the terminal, the monitoring for the PDCCH is skipped for the "On Durations" of the first 3 DRX cycles after the wake up signaling, i.e., the mapping relationship between the wake up signaling and the DRX cycle is 1:3 when the wake up signaling is not detected. The second pattern parameter of the wake up signaling is shown in FIG. 4B, and the mapping relationship between the wake up signaling and the DRX cycle is 1:1. When the terminal detects a wake up signaling, the terminal monitors the PDCCH in the "On Duration" of the first one DRX cycle after the wake up signaling. When the wake up signaling is not detected by the terminal, the monitoring for the PDCCH is skipped for the "On Duration" of the first one DRX cycle after the wake up signaling.

When there are T1 SCCs in the activated state, the first pattern parameter of the wake up signaling is changed to the second pattern parameter, and the monitoring intensity for the PDCCH by the UE becomes more intensive.

For another example, the first pattern parameter of the wake up signaling is shown in FIG. 4C, i.e., the mapping relationship between the wake up signaling and the DRX cycle is 1:2. When the terminal detects a wake up signaling, the terminal monitors the PDCCH during the "On Durations" of the first two DRX cycles after the wake up signaling. When the wake up signaling is not detected by the terminal, the monitoring for the PDCCH is skipped for the "On Durations" of the first two DRX cycles after the wake up signaling. The second pattern parameter of the wake up signaling is shown in FIG. 4E, when the terminal detects a wake up signaling, the terminal monitors and receives the PDCCH during the "On Durations" of the first 2 DRX cycles after the wake up signaling, i.e., the mapping relationship between the wake up signaling and the DRX cycle is 1:2 when the wake up signaling is detected. When the wake up signaling is not detected by the terminal, the monitoring for the PDCCH is skipped for the "On Duration" of the first one DRX cycle after the wake up signaling, i.e., the mapping relationship between the wake up signaling and the DRX cycle is 1:1 when the wake up signaling is not detected.

When there are T1 SCCs in the activated state, the first pattern parameter of the wake up signaling is changed to the second pattern parameter, and the monitoring intensity for the PDCCH by the UE becomes more intensive.

In summary, in the method provided in this embodiment, after the first pattern parameter is adopted for the wake up signaling, the UE changes the pattern parameter of the wake up signaling to the second pattern parameter according to the existing T1 SCCs that are in the activated state, so that the monitoring intensity of the UE for the PDCCH is adjusted, which saves the power used by the UE for monitoring.

Figure 12:
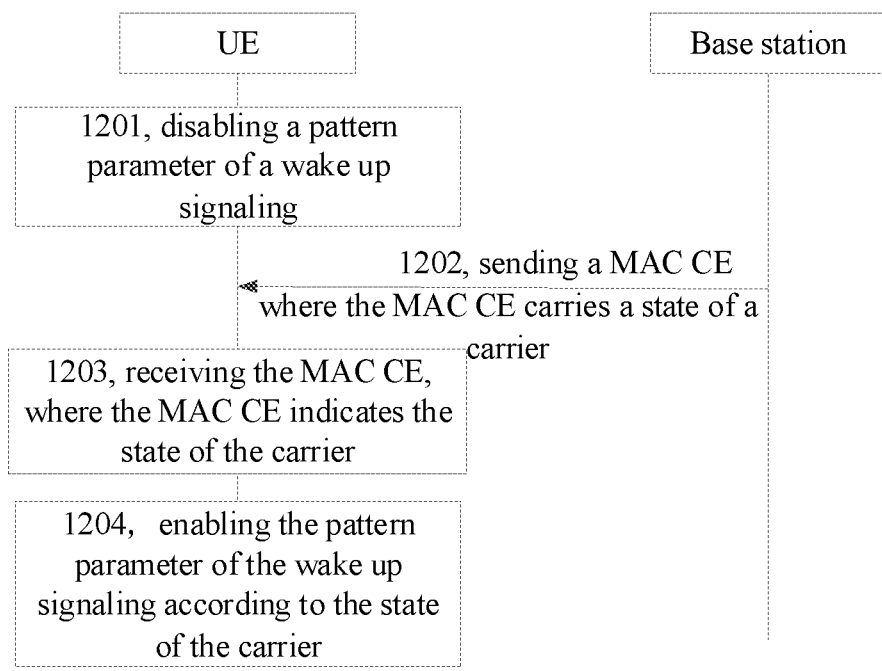
FIG. 12 is a flow chart of a method for dynamically changing a parameter of a wake up signaling provided by an embodiment of the present disclosure.

With reference to FIG. 12, FIG. 12 shows a flow chart of a method for dynamically changing a parameter of a wake up signaling provided by an embodiment of the present disclosure, which is applied in a carrier aggregation scenario. The change of the pattern parameter of the wake up signaling shown in FIG. 12 is that the disabled pattern parameter of the wake up signaling is changed to the enabled pattern parameter of the wake up signaling. The method includes the following steps.

At step 1201, a pattern parameter of a wake up signaling is disabled.

As shown in FIG. 4A, when the pattern parameter of the wake up signaling is disabled, the UE will monitor the PDCCH in each "On Duration" of the DRX cycles.

At step 1202, the base station sends a MAC CE to the UE, and the MAC CE carries a state of a carrier.

In an optional example, the MAC CE carries a third indication, and the third indication indicates the UE to change the pattern parameter of the wake up signaling.

For example, the third indication may be carried in a reserved bit R of the MAC CE. When each SCC is in an inactive state, R in the MAC CE is set to 1, and the third indication indicates to change from the disabled pattern parameter of the wake up signaling to the enabled pattern parameter.

At step 1203, the UE receives the MAC CE, and the MAC CE indicates the state of the carrier.

For example, the UE confirms the state(s) of all configured SCC(s), in response to a SCC being in an activated state, the UE does not change the pattern parameter of the wake up signaling, and in response to each SCC being in an inactive state, the UE changes the pattern parameter of the wake up signaling.

At step 1204, the UE enables the pattern parameter of the wake up signaling according to the state of the carrier.

When each SCC is in the inactive state, the UE enables the pattern parameter of the wake up signaling. As shown in FIGS. 4B-4D, when the pattern parameter of the wake up signaling is enabled, the wake up signaling can wake up the UE to monitor PDCCH during the "On Duration" of the DRX cycle.

In summary, in the method provided by this embodiment, after the pattern parameter of the wake up signaling is disabled, the UE enables pattern parameter of the wake up signaling according to each SCC being in the inactive state, so that the monitoring intensity of the UE for the PDCCH is adjusted, which saves the power used by the UE for monitoring.

Figure 13:
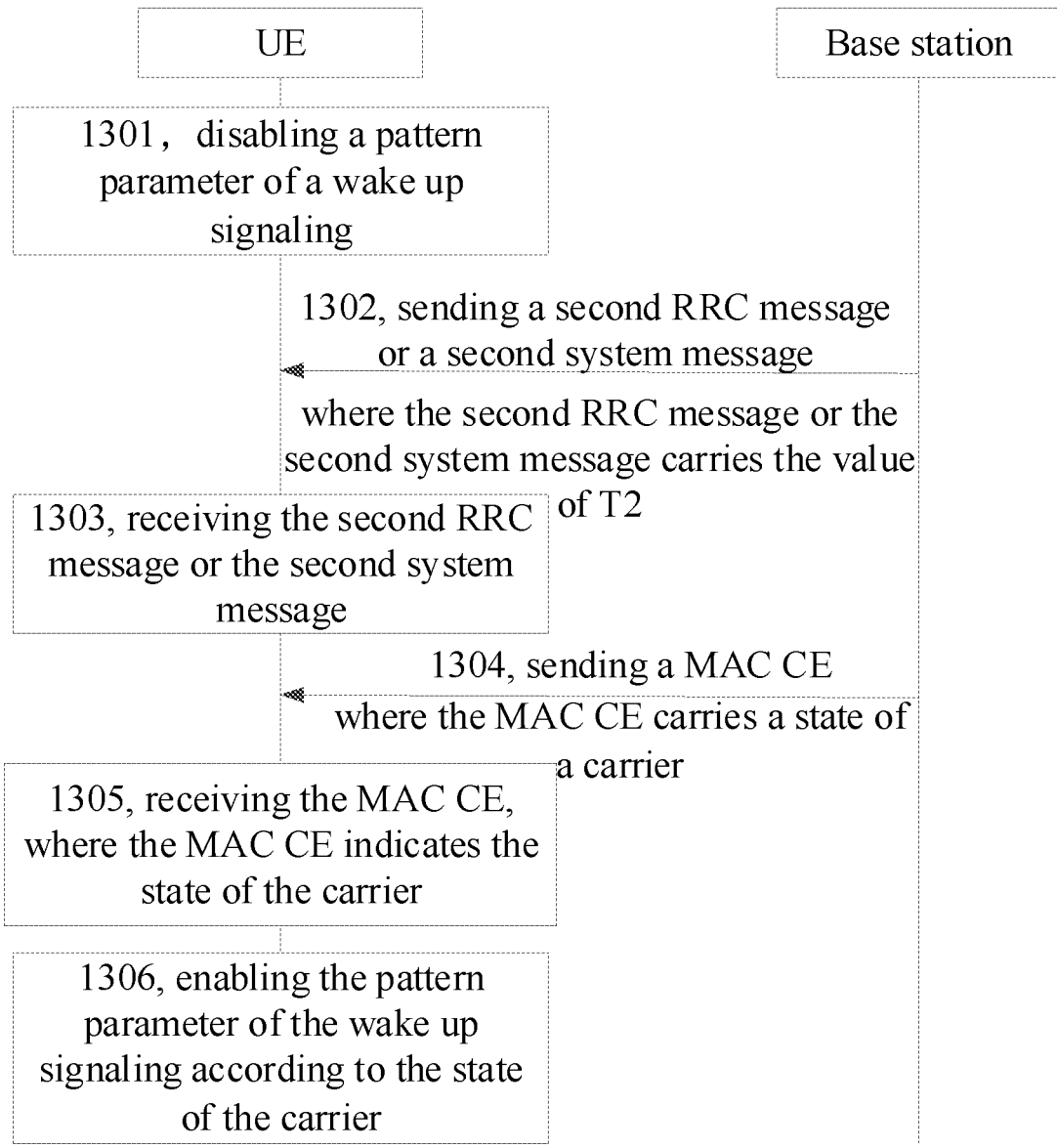
FIG. 13 is a flow chart of a method for dynamically changing a parameter of a wake up signaling provided by an embodiment of the present disclosure.

With reference to FIG. 13, FIG. 13 shows a flow chart of a method for dynamically changing a parameter of a wake up signaling provided by an embodiment of the present disclosure, which is applied in a carrier aggregation scenario. The change of the pattern parameter of the wake up signaling shown in FIG. 13 is that the disabled pattern parameter of the wake up signaling is changed to the enabled pattern parameter of the wake up signaling. The method includes the following steps.

At step 1301, a pattern parameter of a wake up signaling is disabled.

As shown in FIG. 4A, when the pattern parameter of the wake up signaling is disabled, the UE will monitor the PDCCH in each "On Duration" of the DRX cycles.

At step 1302, the base station sends a second RRC message or a second system message to the UE. The second RRC message or the second system message carries the value of T2.

Here, T2 is an integer greater than 1. The second RRC message or the second system message refers to an RRC message or a system message notifying the UE that the monitoring intensity for PDCCH will decrease.

At step 1303, the UE receives the second RRC message or the second system message.

At step 1304, the base station sends a MAC CE to the UE, and the MAC CE carries a state of a carrier.

In an optional example, the MAC CE further carries a third indication, and the third indication indicates the UE to change the pattern parameter of the wake up signaling.

For example, the third indication may be carried in a reserved bit R of the MAC CE. When there are T2 SCCs in an inactive state, R in the MAC CE is set to 1, and the third indication indicates to change from the disabled pattern parameter of the wake up signaling to the enabled pattern parameter.

At step 1305, the UE receives the MAC CE, and the MAC CE indicates the state of the carrier.

For example, the UE confirms the states of all configured SCCs, in response to less than T2 SCCs being in the inactive state, the UE does not change the pattern parameter of the wake up signaling, and in response to T2 SCCs being in the inactive state, the UE changes the pattern parameter of the wake up signaling.

At step 1306, the UE enables the pattern parameter of the wake up signaling according to the state of the carrier.

When there are T2 SCCs in the inactive state, the UE enables the pattern parameter of the wake up signaling. As shown in FIG. 4B, FIG. 4C, or FIG. 4D, when the pattern parameter of the wake up signaling is enabled, the wake up signaling can wake up the UE to monitor PDCCH during the "On Duration" of the DRX cycle.

In summary, in the method provided by this embodiment, after the pattern parameter of the wake up signaling is disabled, the UE enables pattern parameter of the wake up signaling according to the existing T2 SCCs that are in the inactive state, so that the monitoring intensity of the UE for the PDCCH is adjusted, which saves the power used by the UE for monitoring.

Figure 14:
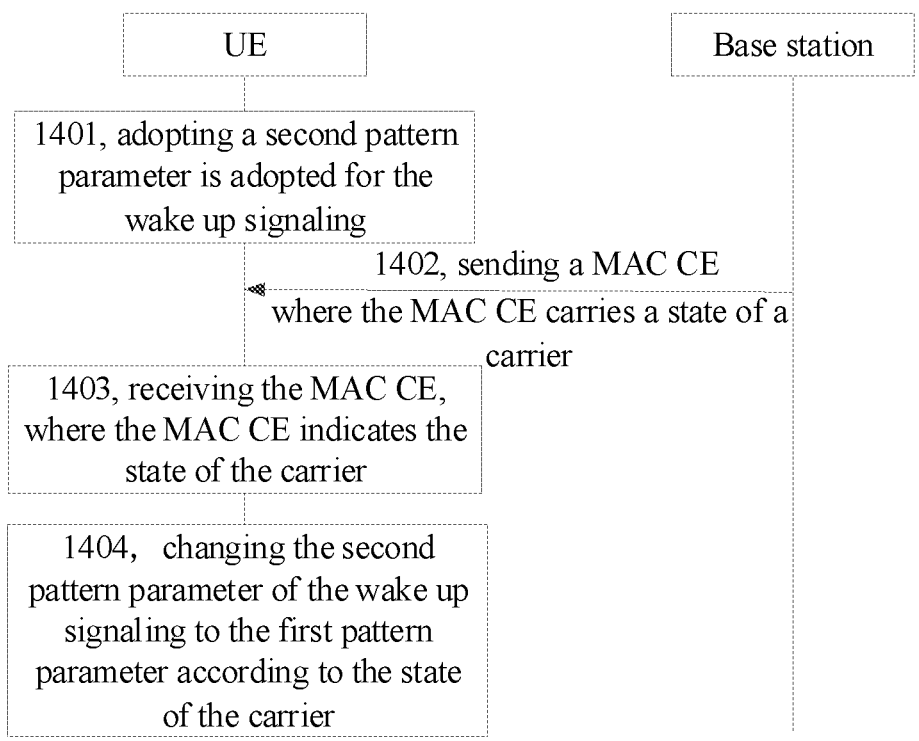
FIG. 14 is a flow chart of a method for dynamically changing a parameter of a wake up signaling provided by an embodiment of the present disclosure.

With reference to FIG. 14, FIG. 14 shows a flow chart of a method for dynamically changing a parameter of a wake up signaling provided by an embodiment of the present disclosure, which is applied in a carrier aggregation scenario. The change of the pattern parameter of the wake up signaling shown in FIG. 14 is that the second pattern parameter of the wake up signaling is changed to the first pattern parameter. The method includes the following steps.

At step 1401, a second pattern parameter is adopted for the wake up signaling.

At step 1402, the base station sends a MAC CE to the UE, and the MAC CE carries a state of a carrier.

In an optional example, the MAC CE carries a fourth indication, and the fourth indication indicates the UE to change the pattern parameter of the wake up signaling.

For example, the fourth indication may be carried in a reserved bit R of the MAC CE. When each SCC is in an inactive state, R in the MAC CE is set to 1, and the fourth indication indicates to change from the second pattern parameter of the wake up signaling to the first pattern parameter.

At step 1403, the UE receives the MAC CE, and the MAC CE indicates the state of the carrier.

For example, the UE confirms the state(s) of all configured SCC(s), when there is a SCC that is in an activated state, the UE does not change the pattern parameter of the wake up signaling, and when each SCC is in an inactive state, the UE changes the pattern parameter of the wake up signaling.

At step 1404, the UE changes the second pattern parameter of the wake up signaling to the first pattern parameter according to the state of the carrier.

A monitoring intensity for PDCCH corresponding to the first pattern parameter is less than a monitoring intensity for PDCCH corresponding to the second pattern parameter, and the monitoring intensity for PDCCH is determined according to a quantity of DRX cycles mapped by the wake up signaling.

For example, the first pattern parameter may be as shown in one of FIGS. 4B-4D, and the second pattern parameter may be shown as the other of FIGS. 4B-4D.

For example, the first pattern parameter of the wake up signaling is shown in FIG. 4D. When the terminal detects a wake up signaling, the terminal monitors and receives the PDCCH during the "On Duration" of the first one DRX cycle after the wake up signaling, i.e., the mapping relationship between the wake up signaling and DRX cycle is 1:1 when the wake up signaling is detected. When the wake up signaling is not detected by the terminal, the monitoring for the PDCCH is skipped for the "On Durations" of the first 3 DRX cycles after the wake up signaling, i.e., the mapping relationship between the wake up signaling and the DRX cycle is 1:3 when the wake up signaling is not detected. The second pattern parameter of the wake up signaling is shown in FIG. 4B, and the mapping relationship between the wake up signaling and the DRX cycle is 1:1. When the terminal detects a wake up signaling, the terminal monitors the PDCCH in the "On Duration" of the first one DRX cycle after the wake up signaling. When the wake up signaling is not detected by the terminal, the monitoring for the PDCCH is skipped for the "On Duration" of the first one DRX cycle after the wake up signaling.

When each SCC is in the inactive state, the second pattern parameter of the wake up signaling is changed to the first pattern parameter, and the monitoring intensity for the PDCCH by the UE becomes sparser.

For another example, the first pattern parameter of the wake up signaling is shown in FIG. 4C, i.e., the mapping relationship between the wake up signaling and the DRX cycle is 1:2. When the terminal detects a wake up signaling, the terminal monitors the PDCCH during the "On Durations" of the first two DRX cycles after the wake up signaling. When the wake up signaling is not detected by the terminal, the monitoring for the PDCCH is skipped for the "On Durations" of the first two DRX cycles after the wake up signaling. The second pattern parameter of the wake up signaling is shown in FIG. 4E, when the terminal detects a wake up signaling, the terminal monitors and receives the PDCCH during the "On Durations" of the first 2 DRX cycles after the wake up signaling, i.e., the mapping relationship between the wake up signaling and the DRX cycle is 1:2 when the wake up signaling is detected. When the wake up signaling is not detected by the terminal, the monitoring for the PDCCH is skipped for the "On Duration" of the first one DRX cycle after the wake up signaling, i.e., the mapping relationship between the wake up signaling and the DRX cycle is 1:1 when the wake up signaling is not detected.

When each SCC is in the inactive state, the second pattern parameter of the wake up signaling is changed to the first pattern parameter, and the monitoring intensity for the PDCCH by the UE becomes sparser.

In summary, in the method provided in this embodiment, after the second pattern parameter is adopted for the wake up signaling, the UE changes the pattern parameter of the wake up signaling to the first pattern parameter according to each SCC being in the inactive state, so that the monitoring intensity of the UE for the PDCCH is adjusted, which saves the power used by the UE for monitoring.

Figure 15:
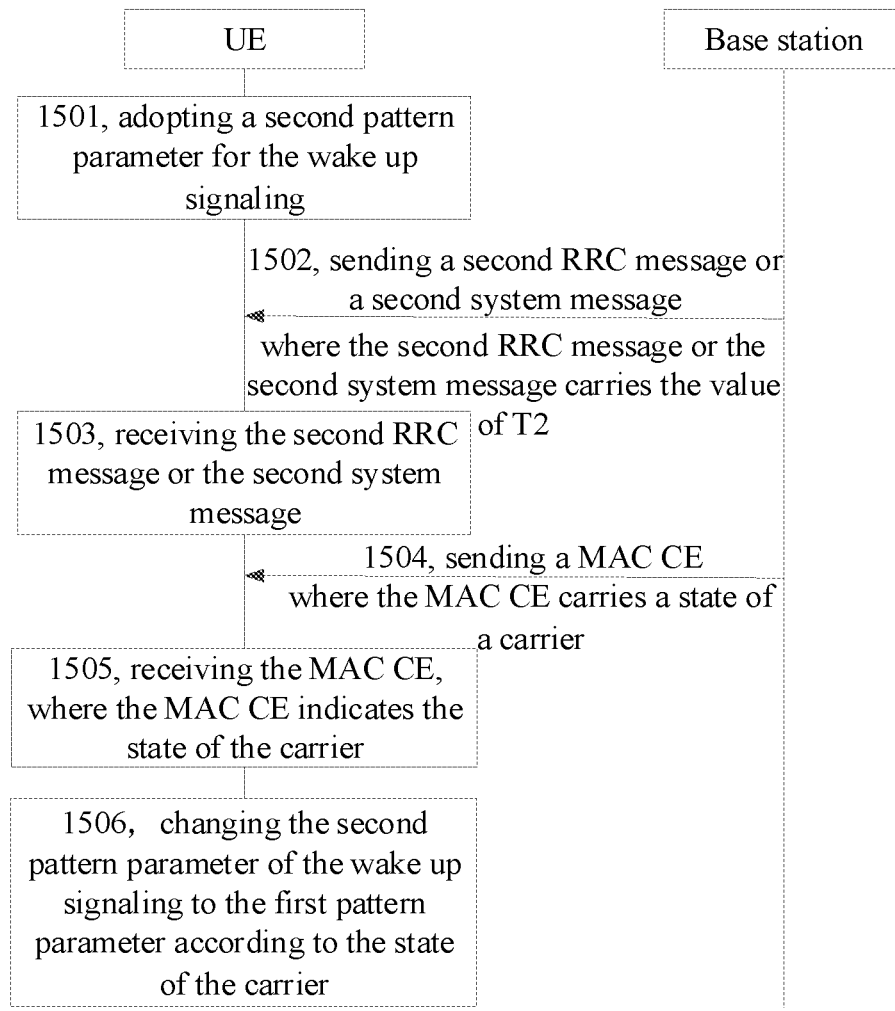
FIG. 15 is a flow chart of a method for dynamically changing a parameter of a wake up signaling provided by an embodiment of the present disclosure.

With reference to FIG. 15, FIG. 15 shows a flow chart of a method for dynamically changing a parameter of a wake up signaling provided by an embodiment of the present disclosure, which is applied in a carrier aggregation scenario. The change of the pattern parameter of the wake up signaling shown in FIG. 15 is that the second pattern parameter of the wake up signaling is changed to the first pattern parameter. The method includes the following steps.

At step 1501, a second pattern parameter is adopted for the wake up signaling.

At step 1502, the base station sends a second RRC message or a second system message to the UE. The second RRC message or the second system message carries the value of T2.

Here, T2 is an integer greater than 1. The second RRC message or the second system message refers to an RRC message or a system message notifying the UE that the monitoring intensity for PDCCH will decrease.

At step 1503, the UE receives the second RRC message or the second system message.

At step 1504, the base station sends a MAC CE to the UE, and the MAC CE carries a state of a carrier.

In an optional example, the MAC CE further carries a fourth indication, and the fourth indication indicates the UE to change the pattern parameter of the wake up signaling.

For example, the fourth indication may be carried in a reserved bit R of the MAC CE. When there are T2 SCCs in an inactive state, R in the MAC CE is set to 1, and the fourth indication indicates to change from the second pattern parameter of the wake up signaling to the first pattern parameter.

At step 1505, the UE receives the MAC CE, and the MAC CE indicates the state of the carrier.

For example, the UE confirms the states of all configured SCCs, in response to less than T2 SCCs being in the inactive state, the UE does not change the pattern parameter of the wake up signaling, and in response to T2 SCCs being in the inactive state, the UE changes the pattern parameter of the wake up signaling.

At step 1506, the UE changes the second pattern parameter of the wake up signaling to the first pattern parameter according to the state of the carrier.

A monitoring intensity for PDCCH corresponding to the first pattern parameter is less than a monitoring intensity for PDCCH corresponding to the second pattern parameter, and the monitoring intensity for PDCCH is determined according to a quantity of DRX cycles mapped by the wake up signaling.

For example, the first pattern parameter may be as shown in one of FIGS. 4B-4D, and the second pattern parameter may be shown as the other of FIGS. 4B-4D.

For example, the first pattern parameter of the wake up signaling is shown in FIG. 4D. When the terminal detects a wake up signaling, the terminal monitors and receives the PDCCH during the "On Duration" of the first one DRX cycle after the wake up signaling, i.e., the mapping relationship between the wake up signaling and DRX cycle is 1:1 when the wake up signaling is detected. When the wake up signaling is not detected by the terminal, the monitoring for the PDCCH is skipped for the "On Durations" of the first 3 DRX cycles after the wake up signaling, i.e., the mapping relationship between the wake up signaling and the DRX cycle is 1:3 when the wake up signaling is not detected. The second pattern parameter of the wake up signaling is shown in FIG. 4B, and the mapping relationship between the wake up signaling and the DRX cycle is 1:1. When the terminal detects a wake up signaling, the terminal monitors the PDCCH in the "On Duration" of the first one DRX cycle after the wake up signaling. When the wake up signaling is not detected by the terminal, the monitoring for the PDCCH is skipped for the "On Duration" of the first one DRX cycle after the wake up signaling.

When there are T2 SCCs in the inactive state, the second pattern parameter of the wake up signaling is changed to the first pattern parameter, and the monitoring intensity for the PDCCH by the UE becomes sparser.

For another example, the first pattern parameter of the wake up signaling is shown in FIG. 4C, i.e., the mapping relationship between the wake up signaling and the DRX cycle is 1:2. When the terminal detects a wake up signaling, the terminal monitors the PDCCH during the "On Durations" of the first two DRX cycles after the wake up signaling. When the wake up signaling is not detected by the terminal, the monitoring for the PDCCH is skipped for the "On Durations" of the first two DRX cycles after the wake up signaling. The second pattern parameter of the wake up signaling is shown in FIG. 4E, when the terminal detects a wake up signaling, the terminal monitors and receives the PDCCH during the "On Durations" of the first 2 DRX cycles after the wake up signaling, i.e., the mapping relationship between the wake up signaling and the DRX cycle is 1:2 when the wake up signaling is detected. When the wake up signaling is not detected by the terminal, the monitoring for the PDCCH is skipped for the "On Duration" of the first one DRX cycle after the wake up signaling, i.e., the mapping relationship between the wake up signaling and the DRX cycle is 1:1 when the wake up signaling is not detected.

When there are T2 SCCs in the inactive state, the second pattern parameter of the wake up signaling is changed to the first pattern parameter, and the monitoring intensity for the PDCCH by the UE becomes sparser.

In summary, in the method provided in this embodiment, after the second pattern parameter is adopted for the wake up signaling, the UE changes the pattern parameter of the wake up signaling to the first pattern parameter according to the existing T2 SCCs that are in the inactive state, so that the monitoring intensity of the UE for the PDCCH is adjusted, which saves the power used by the UE for monitoring.

Figure 16:
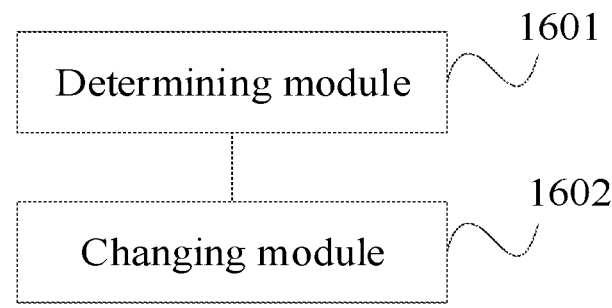
FIG. 16 is a block diagram of an apparatus for dynamically changing a parameter of a wake up signaling provided by an embodiment of the present disclosure.

FIG. 16 shows a block diagram of an apparatus for dynamically changing a parameter of a wake up signaling provided by an embodiment of the present disclosure, applied to a user equipment (UE) in a carrier aggregation scenario, including: a determining module 1601 and a changing module 1602. The determining module 1601 is configured to determine a state of a carrier. The changing module 1602 is configured to change a pattern parameter of a wake up signaling according to the state of the carrier.

Figure 17:
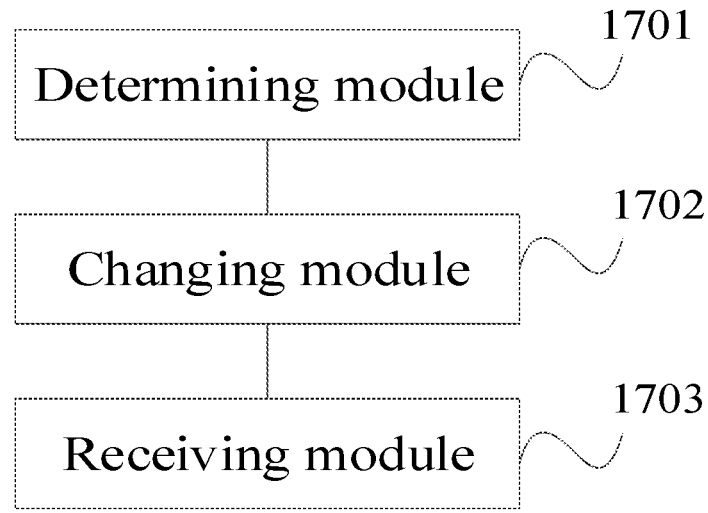
FIG. 17 is a block diagram of an apparatus for dynamically changing a parameter of a wake up signaling provided by an embodiment of the present disclosure.

FIG. 17 shows a block diagram of an apparatus for dynamically changing a parameter of a wake up signaling provided by an embodiment of the present disclosure, applied to a user equipment (UE) in a carrier aggregation scenario, including: a determining module 1601, a changing module 1602, and a receiving module 1603. The determining module 1601 is configured to determine a state of a carrier. The changing module 1602 is configured to change a pattern parameter of a wake up signaling according to the state of the carrier.

In one example, the changing module 1602 is configured to disable the pattern parameter of the wake up signaling according to the state of the carrier.

In one example, the changing module 1602 is configured to enable the pattern parameter of the wake up signaling according to the state of the carrier.

In one example, the changing module 1602 is configured to change a first pattern parameter of the wake up signaling to a second pattern parameter according to the state of the carrier, where a monitoring intensity for PDCCH corresponding to the first pattern parameter is less than a monitoring intensity for PDCCH corresponding to the second pattern parameter, and the monitoring intensity for PDCCH is determined according to a quantity of DRX cycles mapped by the wake up signaling.

In one example, the changing module 1602 is configured to change a second pattern parameter of the wake up signaling to a first pattern parameter according to the state of the carrier, where a monitoring intensity for PDCCH corresponding to the first pattern parameter is less than a monitoring intensity for PDCCH corresponding to the second pattern parameter, and the monitoring intensity for PDCCH is determined according to a quantity of DRX cycles mapped by the wake up signaling.

In one example, the state of the carrier includes a first secondary component carrier being in an activated state.

In one example, the state of the carrier includes at least T1 secondary component carriers being in the activated state.

In one example, the receiving module 1603 is configured to receive a first RRC message or a first system message, where the first RRC message or the first system message carries a value of T1.

In one example, the state of the carrier includes each secondary component carrier being in an inactive state.

In one example, the state of the carrier includes at least T2 secondary component carriers being in the inactive state.

In one example, the receiving module 1603 is configured to receive a second RRC message or a second system message, where the second RRC message or the second system message carries a value of T2.

In one example, the receiving module 1603 is configured to receive a MAC CE indicating the state of the carrier.

In an optional example, the MAC CE carries an indication indicating the UE to change the pattern parameter of the wake up signaling.

Figure 18:
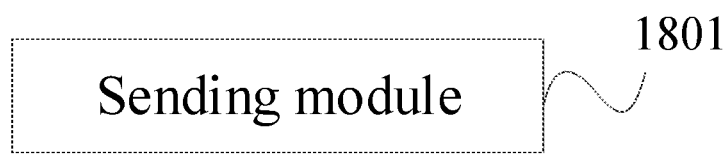
FIG. 18 is a block diagram of an apparatus for dynamically changing a parameter of a wake up signaling provided by an embodiment of the present disclosure.

FIG. 18 shows a block diagram of an apparatus for dynamically changing a parameter of a wake up signaling provided by an embodiment of the present disclosure, applied to a base station in a carrier aggregation scenario, including: a sending module 1801. The sending module 1801 is configured to sending a state of a carrier to a UE, where the state of the carrier triggers the UE to change a pattern parameter of a wake up signaling according to the state of the carrier.

In one example, the sending module 1801 is configured to sending a MAC CE carrying the state of the carrier.

In an optional example, the MAC CE carries an indication indicating the UE to change the pattern parameter of the wake up signaling.

In one example, the state of the carrier includes a first secondary component carrier being in an activated state which is configured for triggering the UE to disable the pattern parameter of the wake up signaling, or configured for triggering the UE to change a first pattern parameter of the wake up signaling to a second pattern parameter.

In one example, the state of the carrier includes at least T1 secondary component carriers being in the activated state which is configured for triggering the UE to disable the pattern parameter of the wake up signaling, or configured for triggering the UE to change a first pattern parameter of the wake up signaling to a second pattern parameter.

In one example, the state of the carrier includes each secondary component carrier being in an inactive state which is configured for triggering the UE to enable the pattern parameter of the wake up signaling, or configured for triggering the UE to change a second pattern parameter of the wake up signaling to a first pattern parameter.

In one example, the state of the carrier includes at least T2 secondary component carriers being in the inactive state which is configured for triggering the UE to enable the pattern parameter of the wake up signaling, or configured for triggering the UE to change a second pattern parameter of the wake up signaling to a first pattern parameter.

In one example, the sending module 1801 is configured to send a first RRC message or a first system message, where the first RRC message or the first system message carries a value of T1.

In one example, the sending module 1801 is configured to send a second RRC message or a second system message, wherein the second RRC message or the second system message carries a value of T2.

Figure 19:
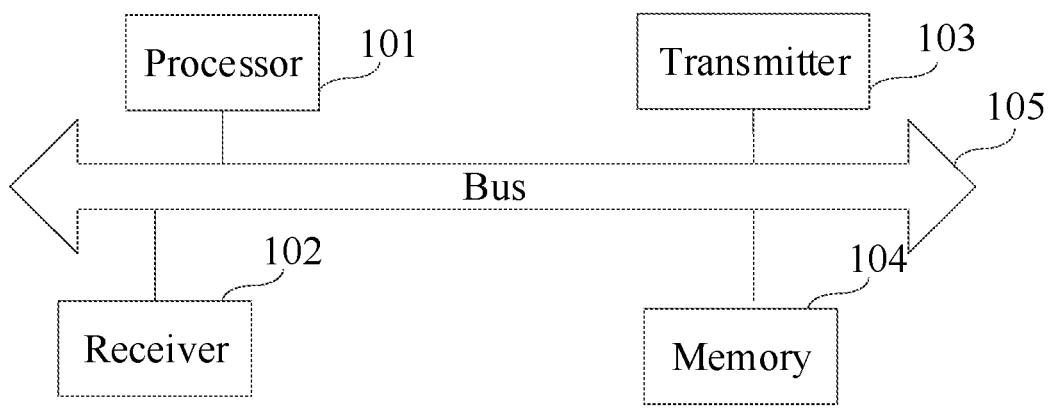
FIG. 19 is a structural schematic diagram of a terminal provided by an embodiment of the present disclosure.

FIG. 19 shows a structural schematic diagram of a terminal provided by an embodiment of the present disclosure. The terminal including: a processor 101, a receiver 102, a transmitter 103, a memory 104 and a bus 105.

The processor 101 includes one or more processing cores, and the processor 101 performs various functional applications as well as information processing by running software programs as well as modules.

The receiver 102 and transmitter 103 can be implemented as a communication component, which can be a communication chip.

The memory 104 is connected to the processor 101 via bus 105.

The memory 104 may be configured to store at least one instruction and the processor 101 is configured to execute the at least one instruction to implement the various steps in the method embodiment described above.

In addition, memory 104 may be implemented by any type of volatile or non-volatile storage device or a combination thereof, volatile or non-volatile storage devices including but not limited to: disks or optical disks, electrically erasable programmable read-only memory (EEPROM), erasable programmable read-only memory (EPROM), static ready access memory (SRAM), read-only memory (ROM), magnetic memory, flash memory, programmable read-only memory (PROM).

In some embodiments, there is also provided a computer-readable storage medium, the computer-readable storage medium having stored therein at least one instruction, at least one program, code set or instruction set, where the at least one instruction, the at least one program, code set or instruction set is loaded and executed by the processor to implement the method for dynamically changing the parameter of the wake up signaling performed by the terminal provided by each of the above method embodiments.

Figure 20:
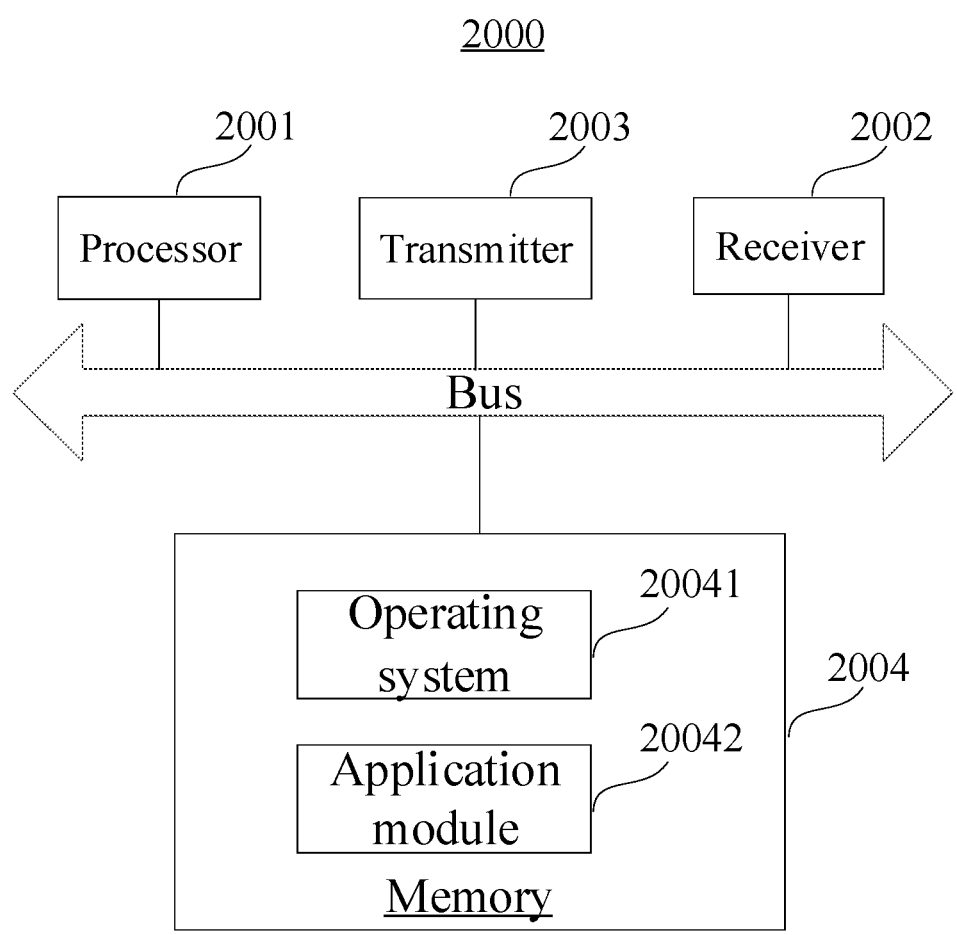
FIG. 20 is a structural schematic diagram of an access network device provided by an embodiment of the present disclosure.

FIG. 20 shows a block diagram of an access network device 2000 provided by an embodiment of the present disclosure.

The access network device 2000 may include: a processor 2001, a receiver 2002, a transmitter 2003 and a memory 2004. The receiver 2002, the transmitter 2003 and the memory 2004 are each connected to the processor 1001 via a bus.

The processor 2001 comprises one or more processing cores, which run software programs and modules to perform the various steps performed by the access network device in the method embodiment described above. The memory 2004 may be configured to store the software programs as well as the modules. Specifically, the memory 2004 may store an operating system 20041, and an application module 20042 required for at least one function. The receiver 2002 is configured to receive communication data from other devices, and the transmitter 2003 is configured to send communication data to other devices.

In some embodiments, there is also provided a computer readable storage medium, the computer readable storage medium having at least one instruction, at least one program, code set or instruction set stored therein, where the at least one instruction, the at least one program, code set or instruction set is loaded and executed by the processor to implement the method for dynamically changing the parameter of the wake up signaling performed by the access network device provided by each of the above method embodiments.

The technical solution provided by the embodiments of the present disclosure includes at least the following beneficial effects.

In the method provided by the embodiments of the present disclosure, the dynamic changes in the pattern parameters of the wake up signaling are notified to the terminal by activation and de-activation of the carrier state, which solves the problem of how to configure the parameter of the wake up signaling in the carrier aggregation scenario to optimize the monitoring intensity of the PDCCH.

It will be understood by those of ordinary skill in the art that all or some of the steps to implement the above embodiments may be accomplished by hardware or may be directed to the relevant hardware by a program, and the program may be stored in a computer readable storage medium. The storage medium may be a read-only memory, disk or CD-ROM, etc.

The foregoing are only optional embodiments of the present disclosure and are not intended to limit the present disclosure, and any modifications, equivalent substitutions, improvements, etc. made within the spirit and principles of the present disclosure shall be included within the scope of protection of the present disclosure.

What is claimed is:

1. A method for dynamically changing a parameter of a wake up signaling, comprising:
   determining, by a user equipment (UE) in a carrier aggregation, a state of a carrier; and
   changing, by the UE, a pattern parameter of a wake up signaling according to the state of the carrier;
   wherein changing the pattern parameter of the wake up signaling according to the state of the carrier, comprises one of:
      disabling the pattern parameter of the wake up signaling according to a first state of the carrier;
      changing a first pattern parameter of the wake up signaling to a second pattern parameter according to the first state of the carrier, wherein a monitoring intensity for Physical Downlink Control Channel (PDCCH) corresponding to the first pattern parameter is less than a monitoring intensity for PDCCH corresponding to the second pattern parameter, and the monitoring intensity for PDCCH is determined according to a quantity of Discontinuous Reception (DRX) cycles mapped by the wake up signaling;
      enabling the pattern parameter of the wake up signaling according to a second state of the carrier; or
      changing the second pattern parameter of the wake up signaling to the first pattern parameter according to the second state of the carrier;
   wherein the first state of the carrier comprises a first secondary component carrier being in an activated state; or at least T1 secondary component carriers being in the activated state, wherein T1 is an integer greater than 1; and wherein in response to determining that the state of the carrier comprises at least T1 secondary component carriers being in the activated state, the method further comprises: receiving a first radio resource control (RRC) message or a first system message, wherein the first RRC message or the first system message carries a value of T1; and
   wherein the second state of the carrier comprises each secondary component carrier being in an inactive state; or at least T2 secondary component carriers being in the inactive state, wherein T2 is an integer greater than 1; and wherein in response to determining that the state of the carrier comprises at least T2 secondary component carriers being in the inactive state, the method further comprises: receiving a second radio resource control (RRC) message or a second system message, wherein the second RRC message or the second system message carries a value of T2.

2. The method of claim 1, wherein determining the state of the carrier comprises:
   receiving a Media Access Control Control Element (MAC CE) indicating the state of the carrier; or
   receiving an MAC CE indicating the state of the carrier, wherein the MAC CE further carries an indication indicating the UE to change the pattern parameter of the wake up signaling.

3. A method for dynamically changing a parameter of a wake up signaling, comprising:
   sending, by a base station in a carrier aggregation, a state of a carrier to a user equipment (UE), wherein the state of the carrier triggers the UE to change a pattern parameter of a wake up signaling according to the state of the carrier;
   wherein sending the state of the carrier comprises: sending a Media Access Control Control Element (MAC CE) carrying the state of the carrier; or sending an MAC CE carrying the state of the carrier, wherein the MAC CE further carries an indication indicating the UE to change the pattern parameter of the wake up signaling;
   wherein the state of the carrier comprises a first state of the carrier configured for triggering the UE to disable the pattern parameter of the wake up signaling, or triggering the UE to change a first pattern parameter of the wake up signaling to a second pattern parameter; or a second state of carrier configured for triggering the UE to enable the pattern parameter of the wake up signaling, or triggering the UE to change the second pattern parameter of the wake up signaling to the first pattern parameter;
   wherein the first state of carrier comprises: a first secondary component carrier being in an activated state, or at least T1 secondary component carriers being in the activated state, wherein T1 is an integer greater than 1; and wherein in response to determining that the state of the carrier comprises at least T1 secondary component carriers being in the activated state, the method further comprises: sending a first radio resource control (RRC) message or a first system message, wherein the first RRC message or the first system message carries a value of T1;
   wherein the second state of carrier comprises: each secondary component carrier being in an inactive state; or at least T2 secondary component carriers being in the inactive state, wherein T2 is an integer greater than 1; and wherein in response to determining that the state of the carrier comprises at least T2 secondary component carriers being in the inactive state, the method further comprises: sending a second radio resource control (RRC) message or a second system message, wherein the second RRC message or the second system message carries a value of T2.

4. A terminal, comprising:
a processor,
a transceiver connected to the processor, and
a memory stored executable instructions for the processor, wherein
the processor is configured to load and execute the executable instructions to:
   determine a state of a carrier; and
   in response to determining that the state of the carrier is a first state of the carrier, change a pattern parameter of a wake up signaling according to the first state of the carrier by disabling the pattern parameter of the wake up signaling or changing a first pattern parameter of the wake up signaling to a second pattern parameter, wherein a monitoring intensity for Physical Downlink Control Channel (PDCCH) corresponding to the first pattern parameter is less than a monitoring intensity for PDCCH corresponding to the second pattern parameter, and the monitoring intensity for PDCCH is determined according to a quantity of Discontinuous Reception (DRX) cycles mapped by the wake up signaling;
   in response to determining that the state of the carrier is a second state of the carrier, change the pattern parameter of the wake up signaling according to the second state of the carrier by enabling the pattern parameter of the wake up signaling or changing the second pattern parameter of the wake up signaling to the first pattern parameter;
   wherein the first state of the carrier comprises a first secondary component carrier being in an activated state; or at least T1 secondary component carriers being in the activated state, wherein T1 is an integer greater than 1; and wherein in response to determining that the state of the carrier comprises at least T1 secondary component carriers being in the activated state, the processor is further configured to: receive a first radio resource control (RRC) message or a first system message, wherein the first RRC message or the first system message carries a value of T1; and
   wherein the second state of the carrier comprises each secondary component carrier being in an inactive state; or at least T2 secondary component carriers being in the inactive state, wherein T2 is an integer greater than 1; and wherein in response to determining that the state of the carrier comprises at least T2 secondary component carriers being in the inactive state, the processor is further configured to: receive a second radio resource control (RRC) message or a second system message, wherein the second RRC message or the second system message carries a value of T2.

5. The base station of claim 3, comprising:
a processor,
a transceiver connected to the processor, and
a memory stored executable instructions for the processor; wherein
the processor is configured to load and execute the executable instructions to:
   send a state of a carrier to a UE by sending an MAC CE, wherein the state of the carrier triggers the UE to change a pattern parameter of a wake up signaling according to the state of the carrier; and the MAC CE carries the state of the carrier, or the state of the carrier and an indication indicating the UE to change the pattern parameter of the wake up signaling;
   wherein the state of the carrier comprises a first state of the carrier configured for triggering the UE to disable the pattern parameter of the wake up signaling, or triggering the UE to change a first pattern parameter of the wake up signaling to a second pattern parameter; or a second state of carrier configured for triggering the UE to enable the pattern parameter of the wake up signaling, or triggering the UE to change the second pattern parameter of the wake up signaling to the first pattern parameter;
   wherein the first state of carrier comprises: a first secondary component carrier being in an activated state, or at least T1 secondary component carriers being in the activated state, wherein T1 is an integer greater than 1; and wherein in response to determining that the state of the carrier comprises at least T1 secondary component carriers being in the activated state, the processor is further configured to: send a first radio resource control (RRC) message or a first system message, wherein the first RRC message or the first system message carries a value of T1;

wherein the second state of carrier comprises: each secondary component carrier being in an inactive state; or at least T2 secondary component carriers being in the inactive state, wherein T2 is an integer greater than 1; and wherein in response to determining that the state of the carrier comprises at least T2 secondary component carriers being in the inactive state, the processor is further configured to: send a second radio resource control (RRC) message or a second system message, wherein the second RRC message or the second system message carries a value of T2.

6. The terminal of claim 4, wherein the processor is further configured to:

receive a Media Access Control Control Element (MAC CE), wherein the MAC CE indicates the state of the carrier, or the MAC CE indicates the state of the carrier and further carries an indication indicating the UE to change the pattern parameter of the wake up signaling.

* * * * *